(12) United States Patent
Togami

(10) Patent No.: US 6,503,004 B2
(45) Date of Patent: Jan. 7, 2003

(54) APPARATUS AND METHOD FOR PROCESSING IMAGE DATA BY APPLYING EDGE EMPHASIS WHILE MINIMIZING DROPOUT

(75) Inventor: Atsushi Togami, Yokosuka (JP)

(73) Assignee: Ricoh Company, Ltd., Tokyo (JP)

( * ) Notice: Subject to any disclaimer, the term of this patent is extended or adjusted under 35 U.S.C. 154(b) by 31 days.

(21) Appl. No.: 09/817,175

(22) Filed: Mar. 27, 2001

(65) Prior Publication Data

US 2001/0051065 A1 Dec. 13, 2001

(30) Foreign Application Priority Data

Mar. 27, 2000 (JP) ........................................ 2000-086829

(51) Int. Cl.⁷ .................................................. B41J 5/30
(52) U.S. Cl. .......................................... 400/63; 358/448
(58) Field of Search .............................. 400/61, 62, 63; 358/448, 453, 455, 456, 457

(56) References Cited

U.S. PATENT DOCUMENTS

| | | | | |
|---|---|---|---|---|
| 4,811,109 A | * | 3/1989 | Shimizu et al. ............. 358/256 |
| 5,230,042 A | * | 7/1993 | Masaki et al. ............... 395/162 |
| 5,436,733 A | * | 7/1995 | Terada et al. ................ 358/448 |
| RE37,272 E | * | 7/2001 | Ochi et al. .................. 358/1.15 |

* cited by examiner

Primary Examiner—Anh T. N. Vo
(74) Attorney, Agent, or Firm—Oblon, Spivak, McClelland, Maier & Neustadt, P.C.

(57) ABSTRACT

An image data processing apparatus separately applies prescribed gradation treatment to character and picture pattern areas of an input image signal in accordance with an image separation signal using a dither pattern and outputs a prescribed image signal to a write section. Such an image data processing apparatus includes a dither pattern storage device for storing at least one dither pattern. An address decoding device is also included so as to decode a prescribed address of the dither pattern storage device from the input image signal and similar signals. Further, a character/picture pattern switch position changing device is included so as to change a character/picture pattern switch position in an image area separation signal using a prescribed signal output from a pixel clock counter so that the switching position from a character portion is delayed, and a picture pattern/character selecting device is included so as to select one of character and picture pattern area in accordance with the changed image area separation signal and outputs the prescribed image signal to the write section.

23 Claims, 26 Drawing Sheets

| -1 | 0 | -1 |
|---|---|---|
| 0 | 4 | 0 |
| -1 | 0 | -1 |

APPARATUS AND METHOD FOR PROCESSING IMAGE DATA BY APPLYING EDGE EMPHASIS WHILE MINIMIZING DROPOUT

CROSS-REFERENCE TO A RELATED APPLICATION

This application claims priority under 35 U.S.C. §119 to Japanese Patent Application No. 2000-086829 filed on Mar. 27, 2000, the entire contents of which are herein incorporated by reference.

BACKGROUND OF THE INVENTION

1. Field of the Invention

The present invention generally relates to an image processing and forming apparatus such as a painter, a copier, a facsimile, etc., and in particular relates to an image processing and forming apparatus capable of minimizing a dropout in a toner image.

2. Discussion of the Background

As proposed in Japanese Patent Application Laid Open No. 11-127348, a printer that separates an input image signal into character and picture pattern areas and processes image data while giving a priority to resolution in a character area and to gradation in a picture pattern area in order to obtain a high printout reproducibility is well known.

FIG. 23 illustrates such a type of a background printer that includes a scanner γ conversion circuit 101, an image area separation circuit 102, a smoothing filter 103, an edge emphasis filter 104, a printer γ correction circuit 105, a gradation circuit 106, and a write apparatus that employs a laser.

An image signal input through a scanner (not shown) is converted from reflection rate data to brightness data by the scanner γ conversion circuit 101. The input image signal is also input to an image area separation circuit 102 and separated into a character area and a picture pattern area. For example, the image area separation circuit 102 outputs an image area separation signal that has one bit which represents a picture pattern area by "0" and a character area by "1". The smoothing filter 103 applies weak smoothing to the character area and strong smoothing to the picture pattern area referring to the image separation signal.

Further, the edge emphasis filter 104 emphasizes an edge in the character area and weakens the same in the picture pattern area referring to the image separation signal, thereby emphasizing the edge of the image. The printer γ correction circuit 105 raises printer γ in the character area and slightly flattens the same in the picture pattern area referring to the image area separation signal, thereby correcting an output value.

The gradation circuit 106 applies a mimetic half tone process such as a dither process, an-error diffusion process, etc., to the picture pattern area referring to the image area separation signal. An output from the gradation circuit 106 is transmitted to the write apparatus 107 via an interface (not shown) thereby controlling a laser device that is provided in the write apparatus 107. Specifically, the output controls activation of a laser beam that is irradiated from the laser device to a photosensitive section member in a pulse state.

As proposed and well known in Japanese Patent Application Laid Open No. 04-248766, an image area separation circuit 102 includes a possible character area detection device that detects a possible character area (i.e., a character edge area) and a white ground area detection device that detects an area neighboring on a white ground. In addition, the image area separation circuit 102 determines an area that belongs to both of the possible character area and the white ground neighboring area as a character area. According to such an image area separation circuit 102, an inside of a character having a relatively bolder line such as a gothic typeface typically is determined as a picture pattern area.

FIG. 24 illustrates one example of brightness data that is obtained by the scanner γ conversion circuit 101. Specifically, a brightness change is illustrated along with a scanning direction of an image that has relatively bolder and half tone (about 128/256 gradations) characters and is put on a white ground. In such brightness data, a middle portion of the character, an edge area thereof, and a white ground are determined by the image area separation circuit 102 as a picture pattern area, a character area, and a picture pattern area, respectively.

FIG. 25 is a diagram for illustrating other brightness data, when edge emphasis treatment is applied by the edge emphasis filter 104 in a manner such that an edge portion between a picture pattern area and a character area is selectively emphasized.

Further, FIG. 26 is a diagram for illustrating still other brightness data when a center of a character is determined by the gradation circuit 106 as a picture pattern area and a line dither pattern having (1×2) pixels is applied thereto. As noted therefrom, a signal in the picture pattern area is converted into multiple high frequency pulses.

In addition, FIGS. 27 and 28 are diagrams for illustrating both a shape of a laser spot whose ON/OFF is controlled by a signal (i.e., brightness data) of FIG. 26 and an image that is to be reproduced on a print medium. Specifically, FIG. 27 illustrates a case when a laser ON/OFF operation is controlled per a pixel to align with a left side thereof as a reference. In contrast, FIG. 28 illustrates a case when a laser ON/OFF operation is controlled per a pixel to align with a right aide thereof as a reference. As understood from these drawings, the laser spot 108 is large and a density of the image reproduced on the print medium is high as a level of the brightness data is high. Thus, an image can be reproduced on a print medium in accordance with an input image signal.

However, according to such an image processing method, since a level of brightness data is lowered by edge emphasis as illustrated in FIG. 26, a dropout occasionally appears in an edge portion between a left side character area and a picture pattern area as illustrated in FIG. 27 when a laser ON/OFF is controlled in a left side alignment. In addition, a dropout occasionally appears in an edge portion between a right side character area and a picture pattern area as illustrated in FIG. 28 when a laser ON/OFF is controlled in a right side alignment.

To overcome such drawbacks, Japanese Patent Application Laid Open No. 11-127348 includes a character contour area detection device that detects a contour of a character, a background area detection device that detects an area neighboring on a background, and a character inside a high density area detection device that detects a character inside a high density area whose coloring density level exceeds a prescribed level and an whose adjacent area includes uniformity of a coloring density higher than a prescribed level.

Japanese Patent Application Laid Open No. 11-127348 further includes an image separation device that separates and determines images that a character contour and background area and a character inside high density area are determined as character areas, and a remaining area as a picture pattern area. According to such a technology, a dropout can be minimized because the character inside a high density area is determined as a character area, and accordingly, an inside portion of the character is not separated into the character area and the picture pattern area.

As an edge emphasis filter 104, a Laplace operation edge emphasis filter has widely been known. However, a Laplace operation has disadvantages such as over or under shoot that occurs in a portion other than an edge due to ringing. As a result, an edge generally is excessively emphasized and a dropout appears on a color background or the like, and in particular, when the under shoot occurs, thereby causing remarkable deterioration of an image.

As improvements of such above-described technology, Japanese Patent Application Laid Open Nos. 7-162687 and 8-149305 have been known.

Specifically, Japanese Patent Application Laid Open No. 7-162687 proposes a technology that can remove excessive emphasis that occurs when an edge is emphasized at around an area boundary by controlling an edge emphasis level. Japanese Patent Application Laid Open No. 8-149305 also proposes a technology that can minimize ringing that generally occurs when an edge is emphasized in a prescribed manner by a Laplace operation that is widely employed. Specifically, a value of a target pixel is compared with five values of ambient pixels (e.g., a larger value of the (K) rank, a smaller value of the (L) rank, when a plurality of ambient pixel values is ranked from the largest or smallest, a pair of values obtained by adding a pair of prescribed offsets to these larger and smaller values, and an average of these larger and smaller values). Then, a prescribed output of the edge emphasis is determined among these five comparisons.

However, hardware (i.e., construction) of an image separation device of a printer of Japanese Patent Application Laid Open No. 11-127348 is complex when compared, for example, with that of Japanese Patent Application Laid Open No. 4-248766. This is because the technology of Japanese Patent Application Laid Open No. 11-127348 should be provided with an image separation device that includes a character contour area detection device that detects a contour area of a character, a background area detection device that detects an area that neighbors on a background, a character inside high density area detection device that detests a character inside a high density area whose coloring density level exceeds a prescribed level and an whose adjacent area includes uniformity of a coloring density is higher than a prescribed level, and an area determination device that determines both a character contour and background area and a character inside a high density area as character areas, and a remaining area as a picture pattern area.

In addition, the edge emphasis filter of Japanese Patent Application Laid Open No. 7-162587 proposes only in relation to an area boundary, and is not efficient against excessive emphasis that causes at a sharp edge degree such as a character portion. This indeed can be improved when the proposition of Japanese Patent Application Laid Open No. 8-149305 is employed. However, gradation may be deteriorated depending upon an image because only a value defined from ambient pixels can be output.

SUMMARY OF THE INVENTION

Accordingly, an object of the present invention is to address and resolve the above and other problems and provide a new image forming apparatus.

The above and other objects are achieved according to the present invention by providing a novel image data processing apparatus that includes an image area separation signal generating device for generating an image area separation signal. A dither pattern storage device for storing at least one dither pattern and an address decoding device for decoding a prescribed address of the dither pattern storage device in accordance with the input image signal and similar signals may be included. In addition, a changing device for changing a character/picture pattern switch position in the image area separation signal using a signal having a prescribed width and output from a pixel clock counter, and a picture pattern/character selecting device for selecting one of character and picture pattern areas in accordance with the changed image area separation signal may also be included.

In another embodiment, the address decoding device may include a pixel clock counter that has at least one bit and counts a number of pixels in a main scanning direction, a horizontal synchronization signal counter that has at least one bit and counts a number of pixels in a sub scanning direction, and a flip-flop that adjusts delay in an input image signal.

In yet another embodiment, the character/picture pattern switch position changing device may include a flip-flop that latches the input image area separation signal, an inverter that logically inverts the input image area separation signal, and an AND circuit that applies an AND gate to outputs from the flip-flop, and a selector that selects one of signals of the AND circuit and an image separation signal and outputs an image area separation change signal.

In still another embodiment, the image data processing apparatus may include a dither pattern size storage device that stores a number of pixels included in the mimetic halftone pattern, an address decoding device that decodes a prescribed address of the dither pattern storage device in accordance with an input image signal and the number of pixels of the mimetic halftone treatment pattern stored in the dither pattern size storage device, and a changing device that changes the character/picture pattern switch position with reference to an output of the address decoding device.

In another embodiment, the image data processing apparatus may include a write reference position setting device that sets a reference position for writing an input image signal with a dot either to left or right side alignments, and a changing device that changes the character/picture pattern switch position with reference to a signal set in the write reference position setting device and an output of the address decoding device.

In yet another embodiment, an image data processing apparatus may include a value detecting device that detects a value of pixels neighboring on a target pixel, an edge emphasis device that emphasizes an edge of the input image signal using a Laplace operation, a bias adding device that adds a prescribed amount of bias to the value of the neighboring pixels detected by the value detecting device, and a signal outputting device that compares and outputs one of the outputs from the bias adding device and edge emphasis device.

In another embodiment, the value of neighboring pixels is obtained by adding the prescribed amount of bias either to the maximum or minimum values thereof.

In still another embodiment, the bias amount may be determined from the neighboring pixel value.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
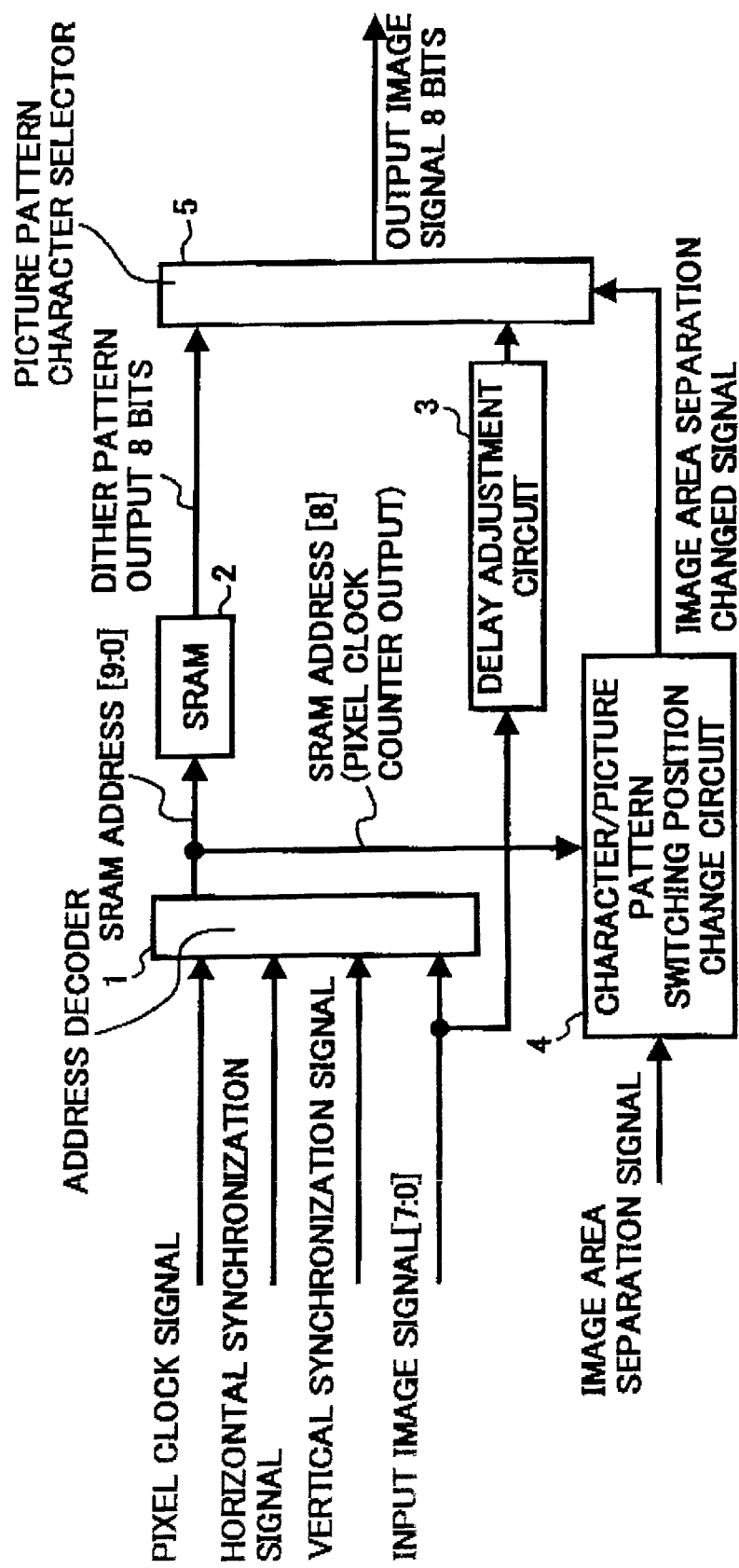
FIG. 1 is a block diagram for illustrating an exemplary image data processing circuit of the first embodiment according to the present invention.

Referring now to the drawings, wherein like reference numerals and marks designate identical or corresponding parts throughout several views, the present invention will be described.

Figure 2:
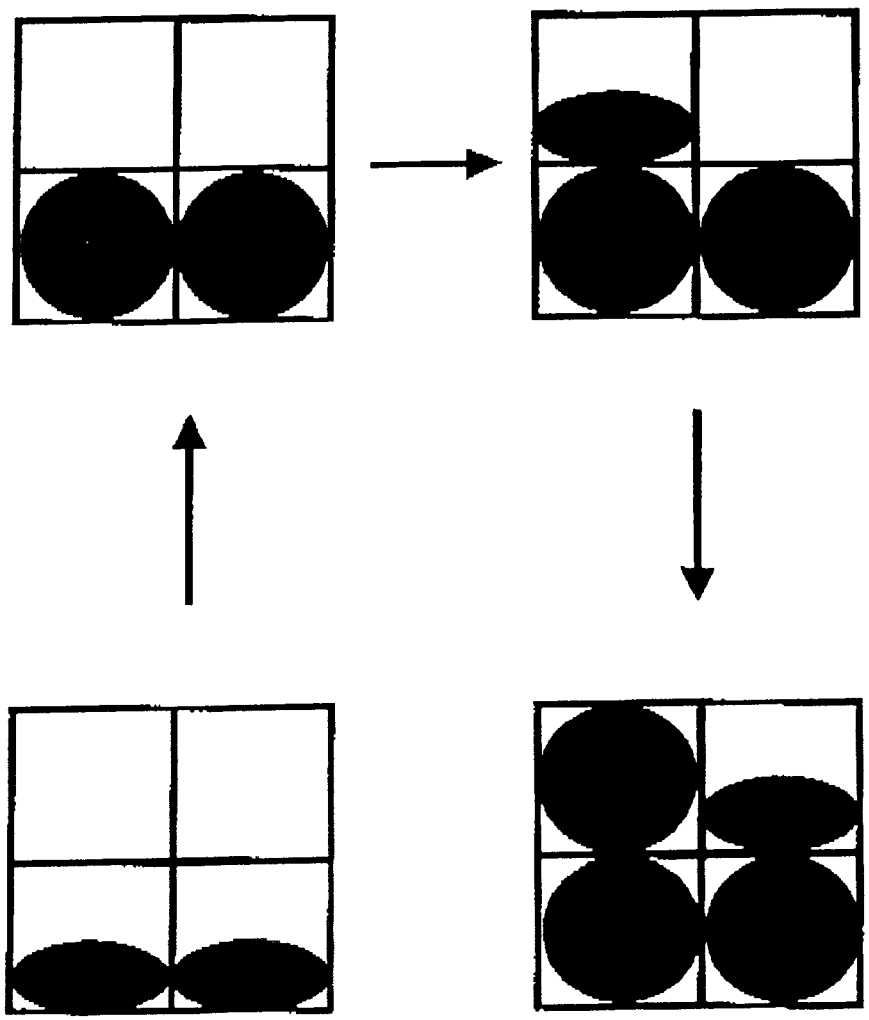
FIG. 2 is a diagram for illustrating an exemplary dither pattern.
Figure 3:
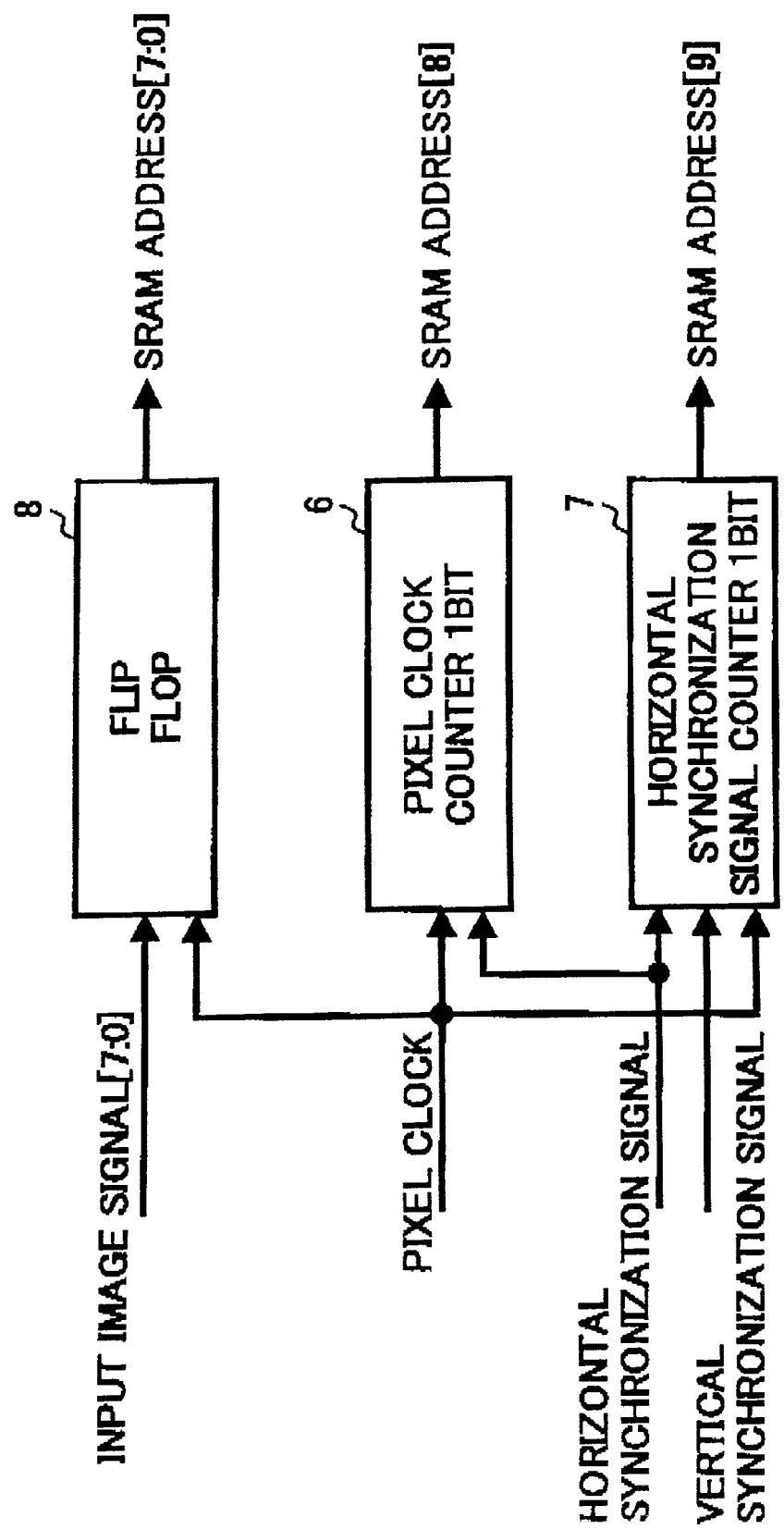
FIG. 3 is a block diagram for illustrating an exemplary address decoder that is provided in the image data processing circuit of the first embodiment illustrated in FIG. 1.
Figure 4:
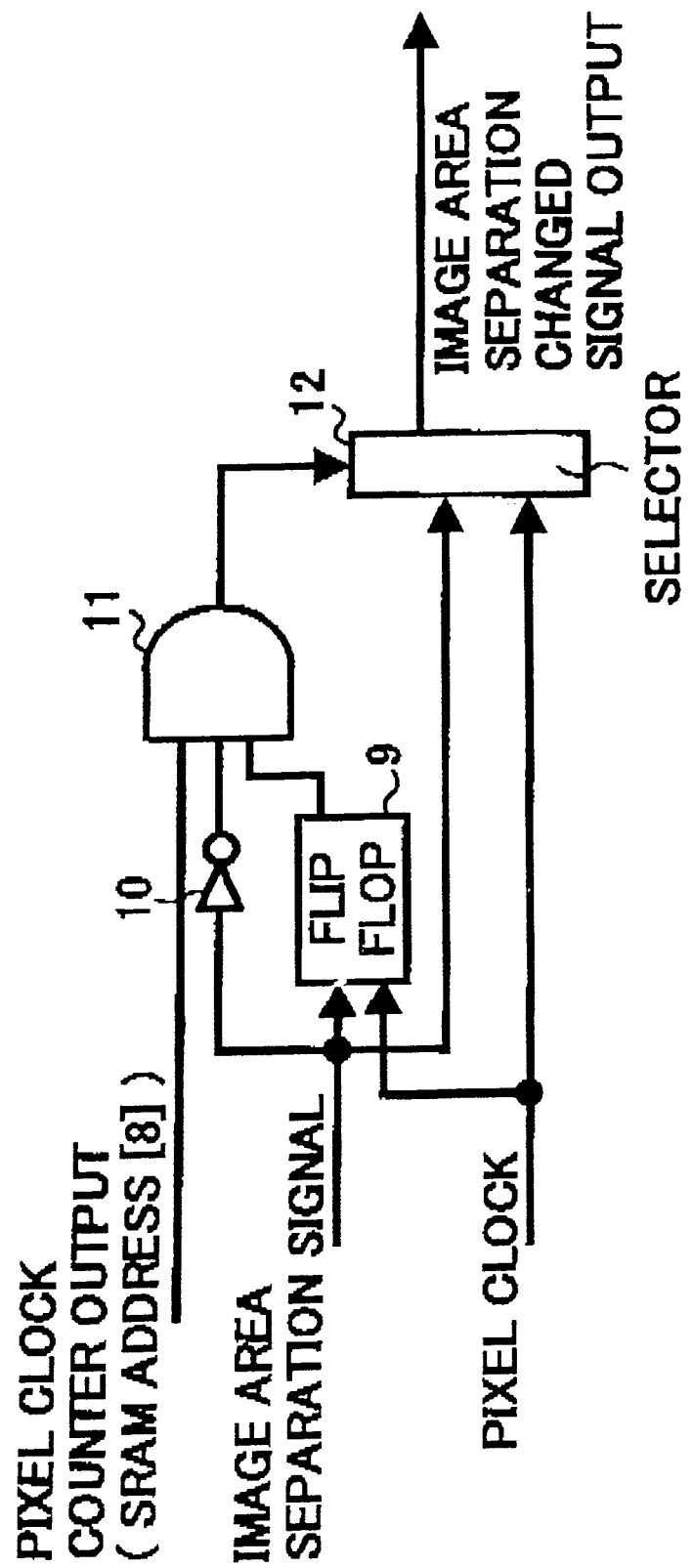
FIG. 4 is a block diagram for illustrating an exemplary character/picture pattern switch position change circuit that is provided in the image data processing circuit of the first embodiment illustrated in FIG. 1.
Figure 5:
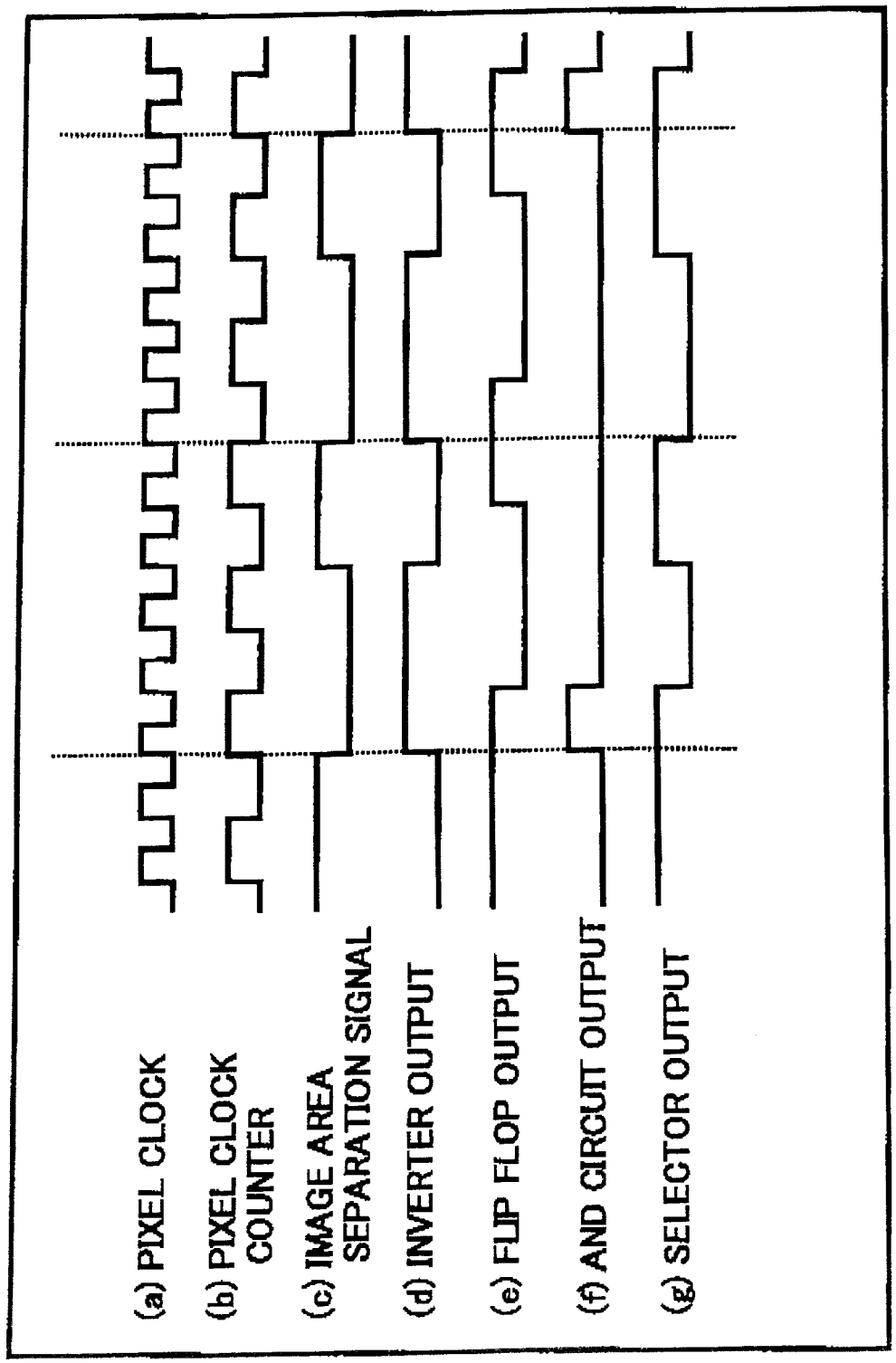
FIG. 5 is a timing chart for illustrating an exemplary operation of character/picture pattern switch position change circuit illustrated in FIG. 4.

The first embodiment of image processing apparatus and method related to a gradation circuit is now described with reference to FIGS. 1 to 5. In more detail, FIG. 1 is a block chart illustrating a gradation circuit according to the first embodiment of the present invention, FIG. 2 is a diagram illustrating one example of a dither pattern, FIG. 3 is a block chart illustrating an address decoder that is provided in the gradation circuit, FIG. 4 is a block chart illustrating a character/picture pattern switch position change circuit that is provided in the gradation circuit, and FIG. 5 is a timing chart illustrating an operation of the character/picture pattern switch position change circuit.

As illustrated in FIG. 1, the gradation circuit may include a SRAM 2 that has 10 bits and stores one or more dither patterns having 2×2 pixels. An address decoder 1 may be included in the gradation circuit so as to receive an input image signal [7:0] that has 8 bits and represents density, a pixel clock that defines a line, and a horizontal synchronous signal that defines a column. In addition, a vertical synchronous signal that defines a page may also be received. The address decoder may then decode and specify an address of the SRAM 2 from these signal. A character/picture pattern switch position change circuit 4 may also be provided therein to change a character/picture pattern switch position of an image separation signal referring to the SRAM address [8] (e. g., output of a pixel clock counter) that is output from the address decoder 1.

A delay adjustment circuit 3 may also be included in the gradation circuit to adjust a delay amount of an input image signal that is utilized in a character area. A picture pattern/character selector 5 may also be included therein so as to select either a dither pattern output from the SRAM 2 in a picture pattern area, or an input image signal output from the delay adjustment circuit 3 in a character area, by referring to an image area separation change signal output from the character/picture pattern switch position change circuit 4. The picture pattern/character selector 5 may then output an image signal having 8 bits.

A SRAM address that has 10 bits and is decoded by the address decoder 1 from all of an input image signal [7:0], the pixel clock, and the horizontal and vertical synchronous signals may be input and converted into a dither pattern by the SRAM 2 that stores one or more dither patterns. The SRAM 2 may store one or more dither patterns having 2×2 pixels as illustrated in FIG. 2. For example, a plurality of addresses for 256 gradations may make a line with a series of units having a total four (i.e., 2×2) pixels, thereby using ten bits (i.e., 256×4=1024=10 bits) in an address space of this example.

This embodiment may control an ON/OFF operation of a laser so that a dot aligns with a left side of a pixel as a reference and a pair of dots simultaneously grows from left side pixels (i.e., even pixel), and then grows in right side pixels (i.e., an odd pixel). Thus, a myriad lines dither pattern may be formed. Further, the dither pattern is not limited to have 2×2 pixels as illustrated in FIG. 2. In addition, a size of the SRAM 2 may be changeable depending on a need.

Among ten bits of the SRAM address [9:0], one bit of an output [8] from the pixel clock counter may also be output to the character/picture pattern switch position change circuit 4. The character/picture pattern switch position change circuit 4 may change a switch position in which a character area switches to a picture pattern area of an image separation signal by referring to the output of the pixel clock counter. The picture pattern/character selector 5 may select a dither pattern in a picture area and an input image signal in a character area, respectively, and obtain and output an image signal having 8 bits to a write section that employs a laser.

As illustrated in FIG. 3, the address decoder 1 may include a pixel clock counter 6 that receives both a pixel clock and a horizontal synchronous signal and counts a number of pixels in a main scanning direction. Such a pixel clock counter 6 may have 1 bit. In addition, a horizontal synchronous signal counter 7 may also be included in the address decoder 1 so as to receive all of the horizontal and vertical synchronous signals and a pixel clock, and to count a number of pixels in a sub scanning direction.

A flip-flop 8 may also be included in the address decoder 1 so as to receive both an input image signal [7:0] and a pixel clock signal and to adjust delay in the input image signal.

The pixel clock counter 6 may detect a position of a dither pattern in the main scanning direction and output (a detection result) as the eighth bit in the SRAM address indicating the code of [8]. Further, the horizontal synchronous signal counter 7 may detect a position of a dither pattern in the sub scanning direction and output (a detection result) as the ninth bit in the SRAM address indicating the code of [9]. The flip-flop 8 may correct delays of these counters 6 and 7, and output a SRAM address [7:0] to the SRAM 2.

As illustrated in FIG. 4, the character/picture pattern switch position change circuit 4 may include a flip-flop circuit 9 that receives both an image area separation signal and a pixel clock and latch the input image area separation signal. An inverter 10 may be included in the character/picture pattern switch position change circuit 4 so as to logically invert the input image area separation signal. An AND circuit 11 may also be included in the character/picture pattern switch position change circuit 4 so as to receive three signals (i.e., output signals from the flip-flop 9 and the inverter 10 and an output (SRAM address [8])) from the pixel clock counter, and form an AND gate for each signal. In addition, a selector 12 may be included in the character/picture pattern switch position change circuit 4 so as to receive outputs of the AND circuit 11 and the image area separation signal and a pixel clock, and to select any one of a high output from the AND circuit 11 and that of the image area separation signal.

In addition, one pixel of the input image area separation signal may be latched by the flip-flop 9. By applying the AND gate 11 to data of the latched one pixel and that logically inverted by the inverter 10, a position where a character area (e.g., high output) is switched to a picture pattern area (e.g., low output) can be detected as illustrated by (d), (e), and (f) in FIG. 5. Thus, if one of a high output of the AND circuit 11 and that of the image area separation signal is selected by the selector 12 in a prescribed manner, a dropout of a character can be minimized. This is because an image separation change signal (a selector signal (g) in FIG. 5) can be obtained at a standing up timing of the image area separation signal ((c) of FIG. 5) with it being delayed by one cycle of the pixel clock (i.e., (a) of FIG. 5). As a result, gradation can be performed for an edge portion between the character and picture pattern areas while regarding as a character area.

Since the switch position of the image separation signal can be changed in the right side pixel (i.e., odd pixel) in the above-described first embodiment as illustrated in FIG. 2, an image area separation signal can be changed in terms of an odd pixel and an edge portion between character and picture pattern areas, if an AND gate is applied to signals including the SRAM address [8] (i.e., a pixel clock counter output (b) in FIG. 5) that is output from the address decoder 1.

Figure 7:
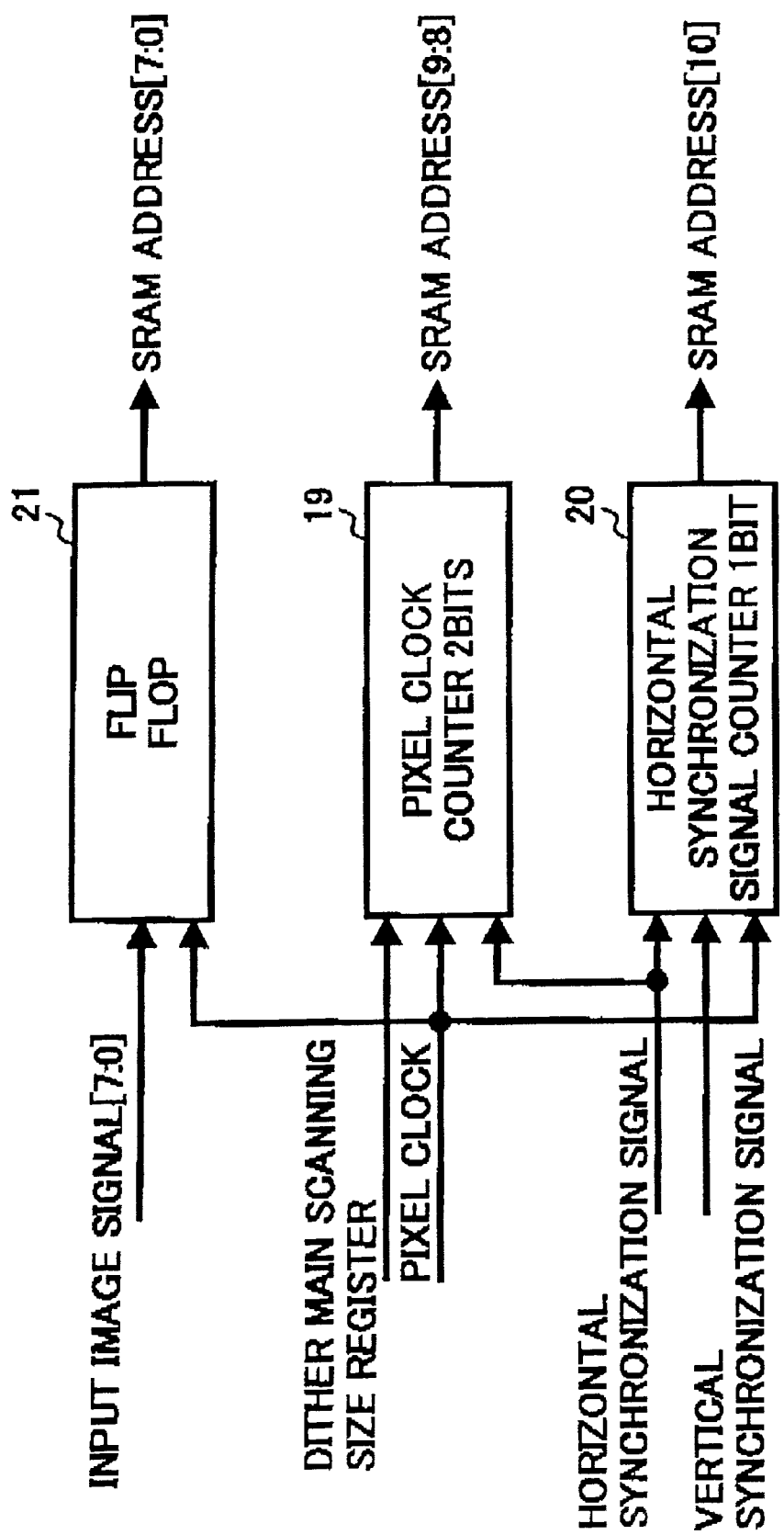
FIG. 7 is a block diagram for illustrating an exemplary address decoder that is provided in the image data processing circuit of the second embodiment illustrated in FIG. 6.
Figure 8:
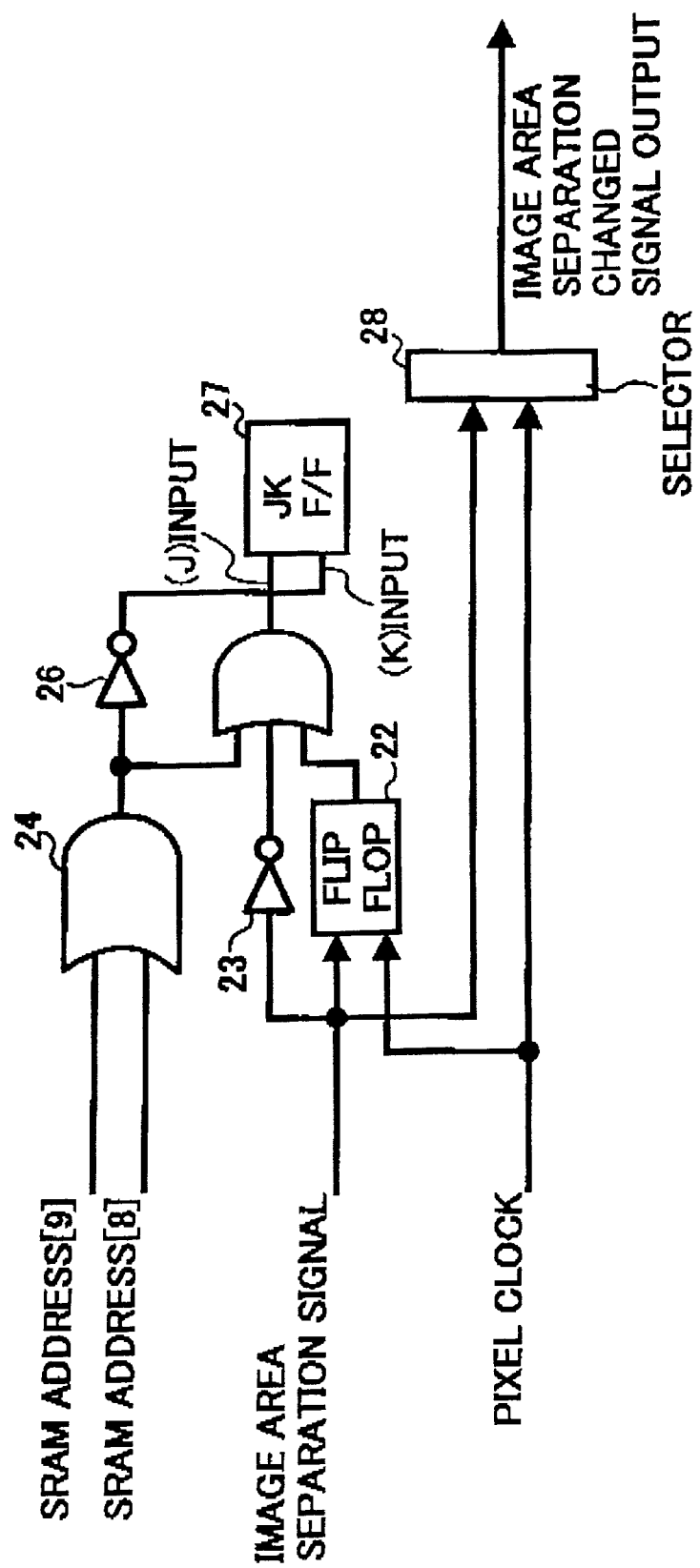
FIG. 8 is a block diagram for illustrating an exemplary character/picture pattern switch position change circuit that is provided in the image data processing circuit illustrated in FIG. 6.
Figure 9:
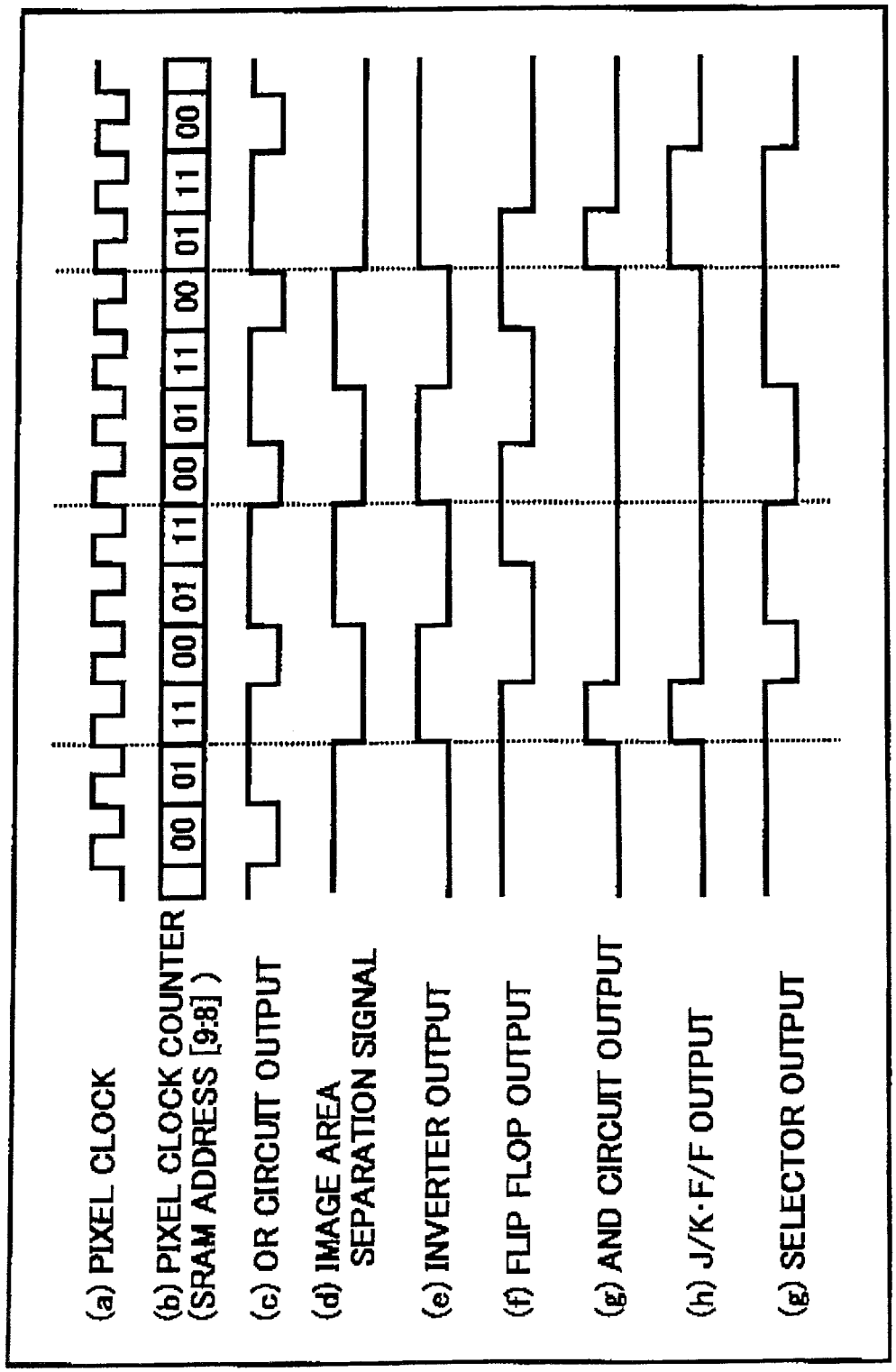
FIG. 9 is a timing chart for illustrating an exemplary operation of the character/picture pattern switch position change circuit illustrated in FIG. 8.

The second embodiment also relating to a gradation circuit is now described with reference to FIGS. 6 to 9. In more detail, FIG. 6 is a block diagram illustrating a gradation circuit according to this embodiment of the present invention, FIG. 7 is a block diagram illustrating an address decoder that is provided in this embodiment of the present invention, FIG. 8 is a block diagram illustrating a character/picture pattern switch position change circuit that is also provided in this embodiment of the present invention, and FIG. 9 is a timing chart illustrating an operation timing of the character/picture pattern switch position change circuit.

Figure 6:
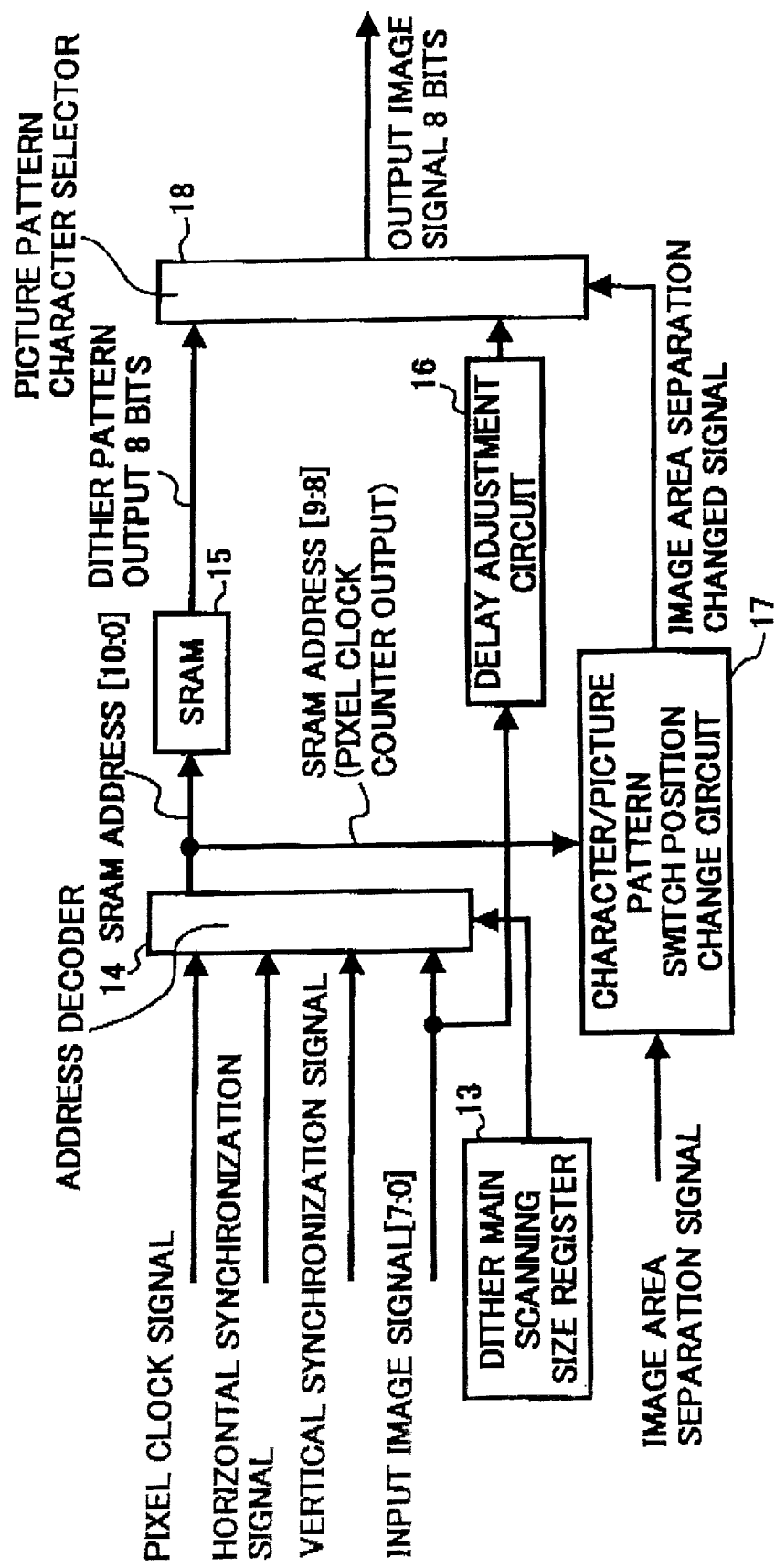
FIG. 6 is a block diagram for illustrating an exemplary image data processing circuit of the second embodiment according to the present invention.

As noted in FIG. 6, the gradation circuit may include a SRAM 15 that has 11 bits and stores one or more dither patterns having from 2×1 to 2×4 pixels. A dither pattern main scanning size register 13 having 2 bits may also be included in the gradation circuit so as to set a number of pixels in a main scanning direction of a dither pattern. An address decoder 14 may also be included in the gradation circuit so as to receive an input image signal [7:0] having 8 bits, a pixel clock, horizontal and vertical synchronous signals, and an output signal of a dither pattern main scanning size register 13 and to decode an address of a SRAM 15 from each of these signals.

A character/picture pattern switch position change circuit 17 may also be included in the gradation circuit so as to refer to an SRAM address [9:8] (a pixel clock counter output) that is output from the address decoder 14 and to change a character/picture pattern switch position of an image area separation signal. A delay adjustment circuit 16 may also be included so as to adjust delay in an input image signal that is utilized in a character area. A picture pattern/character selector 18 may also be included in the gradation circuit so as to refer to an image area separation change signal that is output from the character/picture pattern switch position change circuit 17, and to select one or more dither patterns that is output from the SRAM 15 in the picture pattern area, and an input image signal that is output from the delay adjustment circuit 16 in the character area in order to output an output image signal having 8 bits.

The above-described embodiment premises that a dither pattern includes from (2×1) to (2×4) pixels that is capable of dealing using 2 bits in the main scanning direction. However, the present invention is not limited thereto and the dither pattern can be expanded to an optional level. A size of the SRAM 15 that stores one or more dither patterns may also be changeable depending on a need. However, to facilitate comprehension of the current embodiment, the dither pattern is assumed to typically have a size of 2×3 pixels.

Further, a SRAM address having 11 bits and being decoded by the address decoder 1 from all of the input image signal [7:0], the pixel clock, the horizontal and vertical synchronous signals, and the output from the dither pattern main scanning size register 13 may be output and converted into a dither pattern in the SRAM 15 that stores one or more dither patterns. Among 11 bits of the SRAM address [10:0], 2 bits [9:8] as an output of the pixel clock counter may also be output to the character/picture pattern switch position change circuit 17.

The character/picture pattern switch position change circuit 17 may refer to the output of the pixel clock counter and change a switch position of the image area separation signal from the character area to the picture pattern area. The picture pattern/character selector 18 may, based on the changed image area separation signal, select one of a dither pattern in a picture pattern area and as input image signal in a character area. The picture pattern/character selector 18 may then obtain and output an image signal having 8 bits to a write section that employs a laser.

As illustrated in FIG. 7, the address decoder 14 may include a pixel clock counter 19 15 that has 2 bits and receives an output signal of the dither pattern main scanning size register 13, a pixel clock, and a horizontal synchronous signal, and that counts a number of pixels in the main scanning direction. A horizontal synchronous signal counter 20 having 1 bit may be included in the address decoder 14 so as to receive horizontal and vertical synchronous signals and a pixel clock, and to count a number of pixels in the sub scanning direction. A flip-flop 21 may also be included so as to receive input image and pixel clock signals and adjust delay in the input image signal.

The pixel clock counter 19 may, based on the dither size that is set to the dither pattern main scanning size register 13, detect a position of the dither pattern in the main scanning direction, and output as the [9:8]-th bit in the SRAM address. The horizontal synchronous signal counter 20 may detect a position of a dither pattern in the sub scanning direction and output as the 11$^{th}$ bit in the SRAM address. In addition, the flip-flop 21 may correct delays that occur in the two counters 19 and 20, and output a SRAM address [7:0] to the SRAM 15.

As illustrated in FIG. 8, the character/picture pattern switch position charge circuit 17 may include a flip-flop 22 that receives an image area separation signal and a pixel clock, and latches the input image area separation signal. An inverter 23 may also be included so as to logically invert the input image area separation signal. An OR circuit 24 may also be included so as to apply an OR gate to SRAM addresses [9:8]. An AND circuit 25 may also be included so as to receive the three signals, i.e., the output signals of the flip-flop 22, the inverter 23, and the OR circuit 24 (pixel clock counter output) and function as the AND gate.

An inverter 26 may also be included so as to logically invert the output of the OR circuit 24. A JK flip-flop 27 may also be included so as to be set and reset by the outputs from the AND circuit 25 and the inverter 26, respectively. A selector 28 may also be included so as to receive a Q output of the JK flip-flop 27, an image area separation signal, and of a pixel clock, and to select one of high outputs of the JK flip-flop 27 and the image area separation signal.

One pixel of the input image area separation signal may be latched by the flip-flop 22. By applying a logical AND gate to such latched data and that is logically inverted by the inverter 23, a switch position from a character area (i.e., high output) to a picture pattern area (low output) can be detected as shown by (e), (f), and (g) of FIG. 9. Hence, when the selector 28 selects one of the high outputs of the JK flip-flop 27 and the image area separation signal in a prescribed manner, an image area separation change signal (i.e., selector output of (i) in FIG. 9) can be obtained at a lay down timing of an image area separation signal (i.e., (d) in FIG. 9) with it being deviated by one or a plurality of frequencies of the pixel clock ((a) in FIG. 9). As a result, gradation can be performed regarding an edge portion between the 20. character area and the picture pattern area as a character area, and thereby a dropout of a character can be minimized.

According to the second embodiment of the present invention, an image area separation signal can be changed in terms of an odd pixel and an edge portion between character and picture pattern areas. This is because the OR circuit 24 applies a logical OR date to the SRAM address [9:8] that is output from the address decoder 14, and outputs both a low level only in the left side of the 2×3 pixels of the dither pattern and a high level in other pixels. In addition, the AND circuit 25 applies an AND gate to the outputs from the OR circuit 24, the flip-flop 22, and the inverter 23.

The output of the AND circuit 25 may be input to a J-input of the JK flip-flop 27 and be utilized as a set signal. To a K-input of the JK flip-flop 27, the output from the OR circuit 24 and logically inverted by the inverter 26 may be input. Thus, once the output of the AND circuit 25 is high, it does not return to a low level unless the output of the OR circuit 74 is low. Since the output of the OR circuit 24 is low only in a left side of the dither pattern having the 2×3 pixels, a value of the JK flip-flop 27 may be maintained until that situation.

Accordingly, even if the dither size varies, a dropout in the edge portion between the character area and the picture pattern area can be minimized if a set condition to the dither pattern main scanning size register 13 is changed.

The third embodiment also relating to a gradation circuit of the image data processing apparatus and method is now described with reference to FIGS. 10 and 11. In more detail, FIG. 10 is a block diagram illustrating a gradation circuit according to this embodiment of the present invention, and FIG. 11 is a block diagram illustrating a character/picture pattern switch position change circuit that is provided in the gradation circuit.

Figure 10:
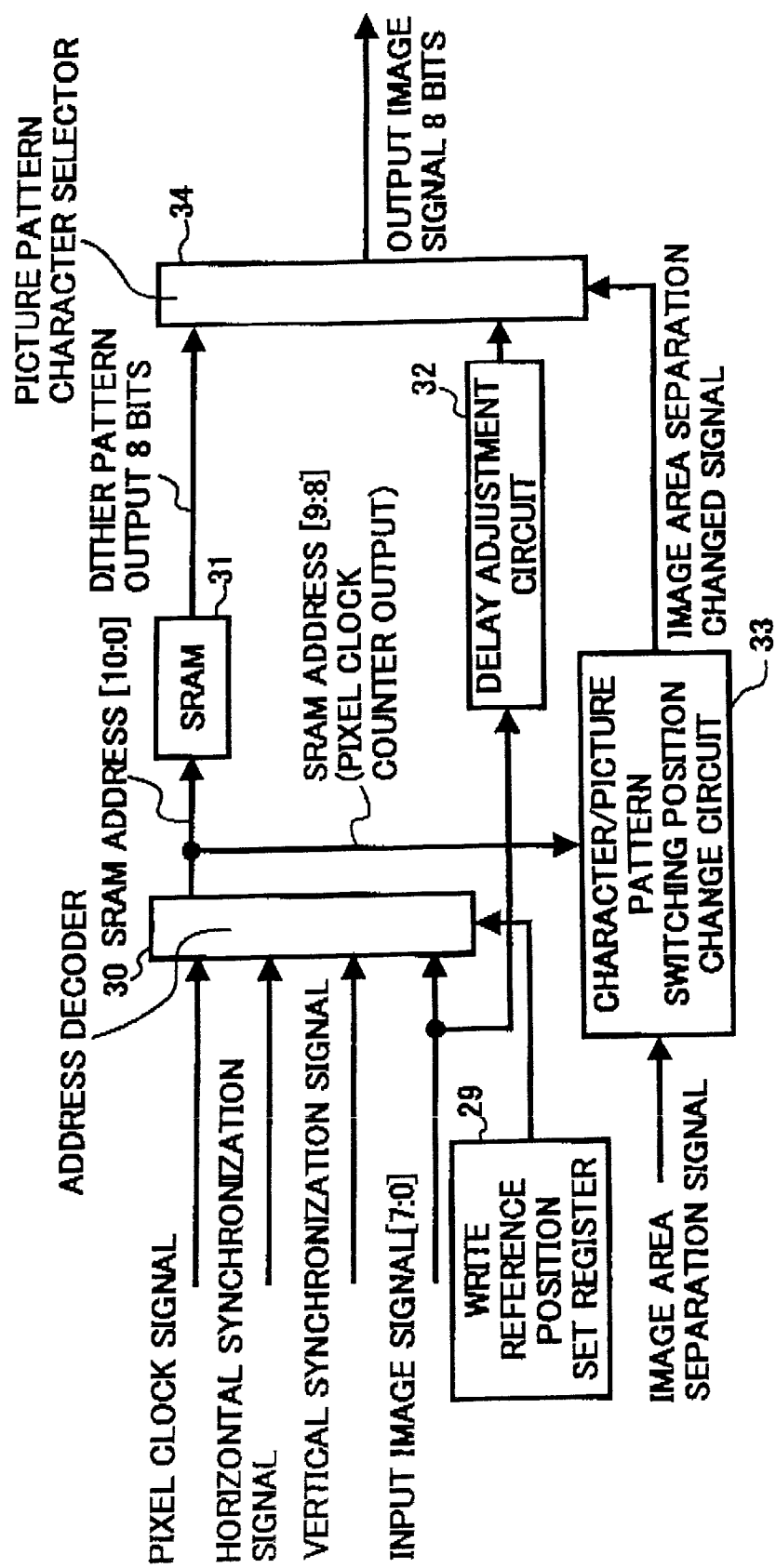
FIG. 10 is a block diagram for illustrating an exemplary image data processing circuit of the third embodiment according to the present invention.
Figure 11:
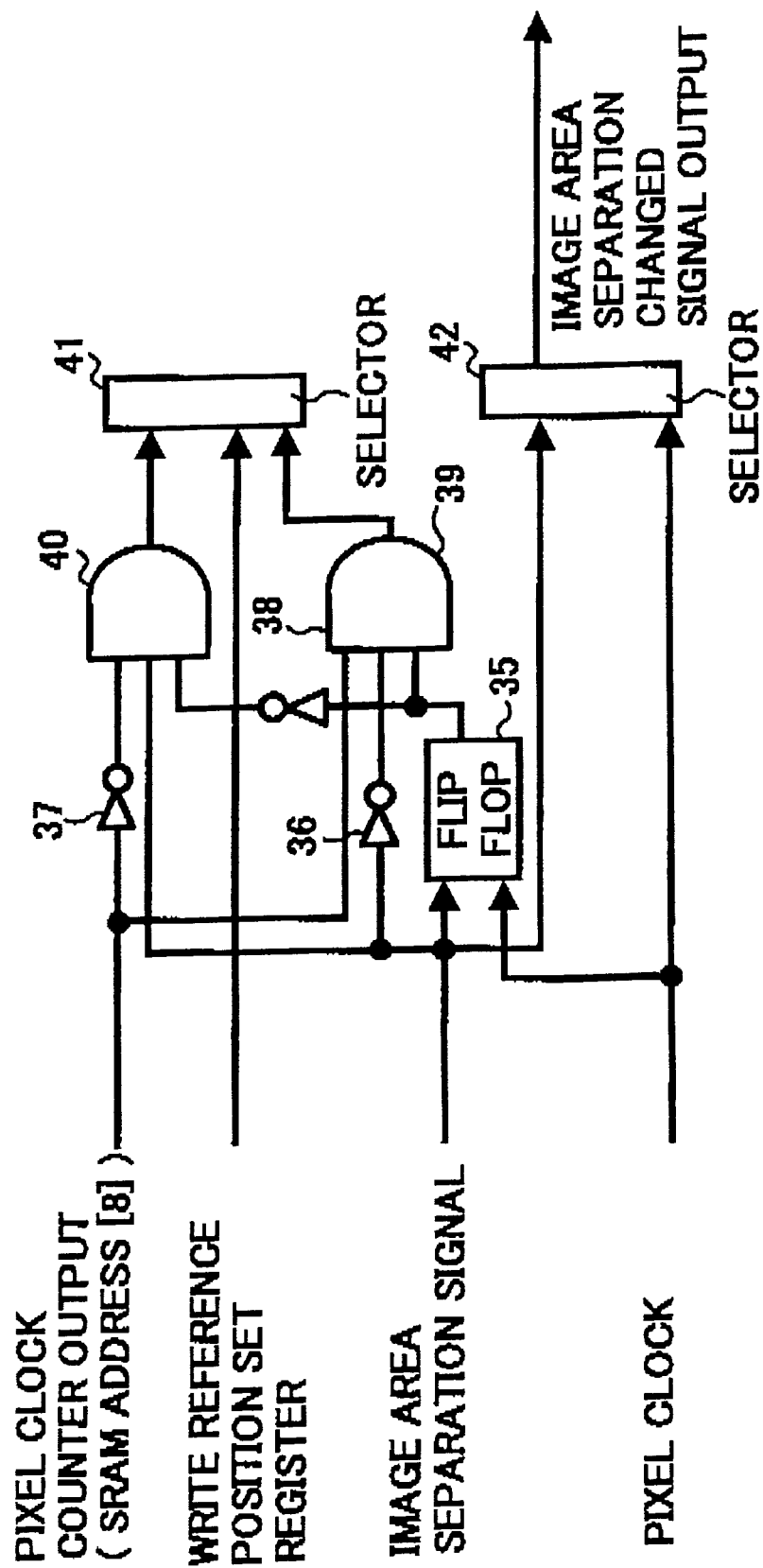
FIG. 11 is a block diagram for illustrating an exemplary character/picture pattern switch position change circuit that is provided in the image data processing circuit of the third embodiment illustrated is FIG. 10.

As noted in FIG. 10, the gradation circuit may include a write reference position set register 29 that sets either left side or right side alignment conditions as references for a laser write operation. A SRAM 31 having 10 bits may be included in the gradation circuit so as to store one or more dither patterns having 2×2 pixels as illustrated in FIG. 2. An address decoder 30 may also be included so as to receive an input image signal [7:0] having 8 bits, a pixel clock, horizontal and vertical synchronous signals, and to decode an address of the SRAM 31 from each of these signals.

A character/picture pattern switch position change circuit 33 may also be included so as to refer to the SRAM address [9:8] (i.e., output of a pixel clock counter) that is output from the address decoder 30, and an output of the write reference set register 29, and to change a character/picture pattern switch position of the image area separation signal. A delay adjustment circuit 32 may also be included so as to adjust delay in an input image signal that is utilized in a character area.

A picture pattern/character selector 34 may also be included so as to refer to an image area separation signal that is output from the character/picture pattern switch position change circuit 33. The picture pattern/character selector 34 may then select one of a dither pattern that is output from the SRAM 31 in a picture pattern area and an input image signal that is output from the delay adjustment circuit 32 in a character area. The picture pattern/character selector 34 may then output an image signal having 8 bits.

The SRAM address having 10 bits and which is decoded by the address decoder 1 from the input image signal [7:0], the pixel clock, and both the horizontal and vertical synchronous signals may output and is converted into a dither pattern in the SRAM 31 that stores one or more dither patterns. Among 10 bits of the SRAM address [9:0], 1 bit such as a pixel clock counter output [8] may also be output to the character/picture pattern switch change circuit 33. The character/picture pattern switch position change circuit 33 may refer to the output of the pixel clock counter and change a switch position of the image area separation signal from a character area to a picture pattern area.

In addition, the character/picture pattern switch position change circuit 33 may output the changed image area separation signal to the picture pattern/character selector 34. Simultaneously, the character/picture pattern switch position change circuit 33 may change a changing manner after referring to the write reference position set register 29.

In this embodiment, it is premised that a low signal may be set to the write reference if position set register 29 in the case of the left side alignment. In contrast, a high signal may be assumed be set to the write reference position set register 29 in the case of the right side alignment. The picture pattern/character selector 34 may select one of a dither pattern and an input image signal is accordance with picture pattern and character areas. The picture pattern/character selector 34 may then obtain and output an image signal having 8 bits to a write section that employs a laser.

An address decoder that is substantially the same as illustrated in FIG. 3 may be employable as the above-described address decoder 30.

As illustrated in FIG. 11, the above-described character/picture pattern switch position change circuit 33 may include a flip-flop 35 that receives an image area separation signal and a pixel clock, and latches the input image area separation signal. An inverter 36 may also be included so as to logically invert the input image area separation signal. Further, an AND circuit 39 may also be included so as to receive three signals such as outputs of the flip-flop 35 and the inverter 36 that logically inverts the input image area separation signal, and an output (SRAM address [8]) of the pixel clock counter, and to apply an AND gate thereto. A pair of inverters 37 and 38 may also be included so as to logically invert outputs of the pixel clock counter and the flip-flop 35, respectively.

An AND circuit 40 may also be included so as to receive and apply an AND gate to three signals such as outputs of the inverters 37 and 38 and the image area separation signal.

A selector 41 may also be included so as to select one output of these two AND circuits 39 and 40 based on the signal of the reference position register 29. A selector 42 may also be included so as to select one of a combination of high outputs of the selector 41 and the image area separation signal, or that of a low output of the selector 41 and a high output of the image area separation signal in accordance with a signal of the write reference position register 29.

One pixel of the input image area separation signal may be latched by the flip-flop 9. By applying an AND gate to thus latched data and data logically inverted by the inverter 36, a switch position where a picture pattern area is switched to a character area can be detected.

In addition, a condition defined by a position where a picture pattern area is switched from a character area and an odd pixel can be detected by inputting the SRAM address [8] that is output from the address decoder 30 to the AND circuit 39. Similarly, a condition defined by a position where a character area is switched from a picture pattern area and an even pixel can be detected by inputting the SRAM address [8] that is output from the address decoder 30 and logically inverted by the inverter 37 to the AND circuit 40. Accordingly, an image area separation signal can be obtained in accordance with a set value that is set to the write reference position set register 29 when the selector 41 selects and outputs to the selector 42 the output of the AND circuit 39 when the set value is low, and outputs the output of the AND circuit 40 when the set value is high.

In addition, the image area separation signal may be obtained when the selector 42 selects the input image area separation signal when the output signal of the selector 41 is low, and selects a high signal when the output signal of the selector 41 is high and the set value is high. In addition, the image area separation signal may be obtained when the selector 42 selects a low signal when both outputs of the selector 41 and the write reference position set register 29 are high. As a result, since a gradation treatment can be applied to an edge portion between the character and picture pattern areas, a dropout of a character can be minimized.

In the above-described first through the third embodiments, a mimetic halftone process may be performed using a dither method. However, the present invention is not limited thereto and can employ another mimetic halftone process such as an error diffusion process or a similar process.

The fourth embodiment relates to an edge emphasis circuit and is now described with reference to FIGS. 12, 16, 17, 19 and 21.

Figure 12:
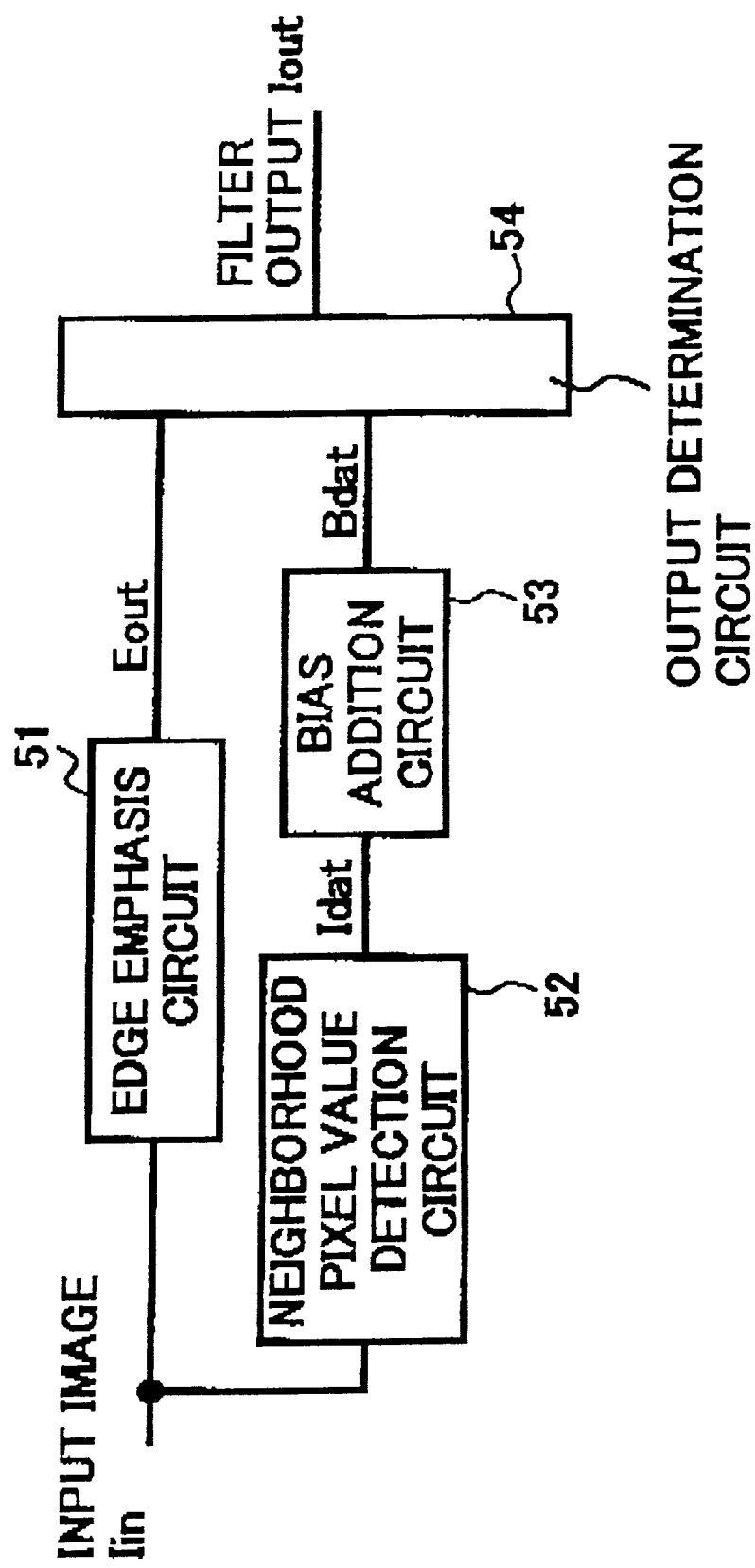
FIG. 12 is a block diagram for illustrating an exemplary construction of an image processing circuit of the fourth embodiment.

In more detail, FIG. 12 is a block diagram for illustrating an important section of an image data processing circuit of an image data process apparatus according to the fourth embodiment. The image data processing circuit may include an edge emphasis circuit 51 that emphasizes an edge of input mono color image data (Iin) using a Laplace operation. A neighborhood pixel value detection circuit 52 may also be included so as to detect, from the input mono color image data (Iin), for example, a value (Idat) of 3×3 pixels that neighbor on and include a target pixel. A bias addition circuit 53 may also be included so as to add a prescribed amount of bias to the output (Idat) from the neighborhood pixel value detection circuit 52. An output determination circuit 54 may also be included so as to control and determine an output from outputs (Eout) and (Bdat) that are output from the edge emphasis circuit 51 and the bias addition circuit 53, respectively.

The input image data (Iin) may be assumed to have 8 bit data (i.e., 256 gradations). In addition, a gradation number for a white portion of a document is assumed to be 255 and that for a black portion is assumed to be zero for the purpose of facilitating the following explanation. However, 4 or 12 bits may of course be employable. Similarly, the neighboring area may be assumed to include a 3×3 pixels. However, 5×3, 3×1, and another number of pixels may be employable.

Figures 16, 17:
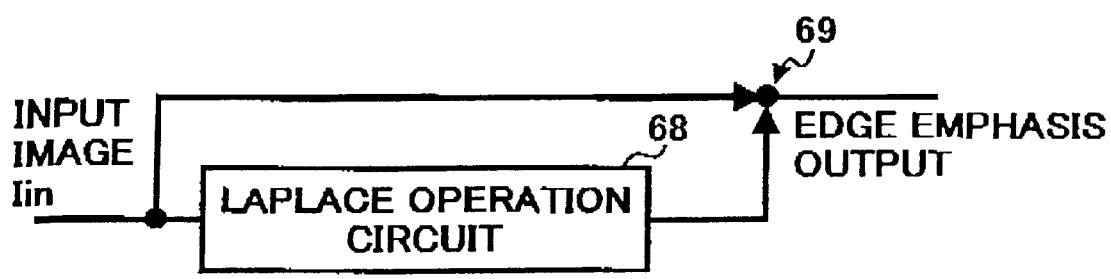
FIG. 16 is a block diagram for illustrating an exemplary construction of an edge emphasis circuit that is utilized in the fourth to seventh embodiments.
FIG. 17 is a diagram for illustrating an exemplary Laplacian operation of a Lapalace operation circuit illustrated in FIG. 15.

The edge emphasis circuit 51 may be a type that uses a Laplacian filter. Thus, the edge emphasis circuit 51 may include a Laplace operation circuit 68 and an adder 69 as illustrated in FIG. 16. As noted therefrom, a numeral 68 denotes the Laplace operation circuit, for example, formed by a Laplacian filter as illustrated in FIG. 17. Such a Laplace operation circuit 68 may function as an edge extraction section that extracts an edge by calculating a difference (in a pixel value) between a target and its neighboring pixels. The adder 69 may add the output of the Laplace operation circuit 68 to the target pixel thereby emphasizing the edge of the target pixel.

Figure 19:
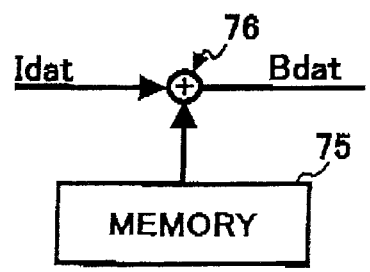
FIG. 19 is a block diagram for illustrating an exemplary construction of a bias addition circuit that is utilized in the fourth to sixth embodiments.

The bias addition circuit 53 may include a memory 75 and an adder 76 as illustrated by a block diagram of FIG. 19. In such a circuit, the adder 76 may add a prescribed amount of bias that is stored in the memory 75 to the output (Idat) from the neighborhood pixel value detection circuit 52, and output an addition result to an output determination circuit 54 of FIG. 12. A positive or negative bias having a prescribed amount may optionally be stored in the memory 75.

Figure 21:
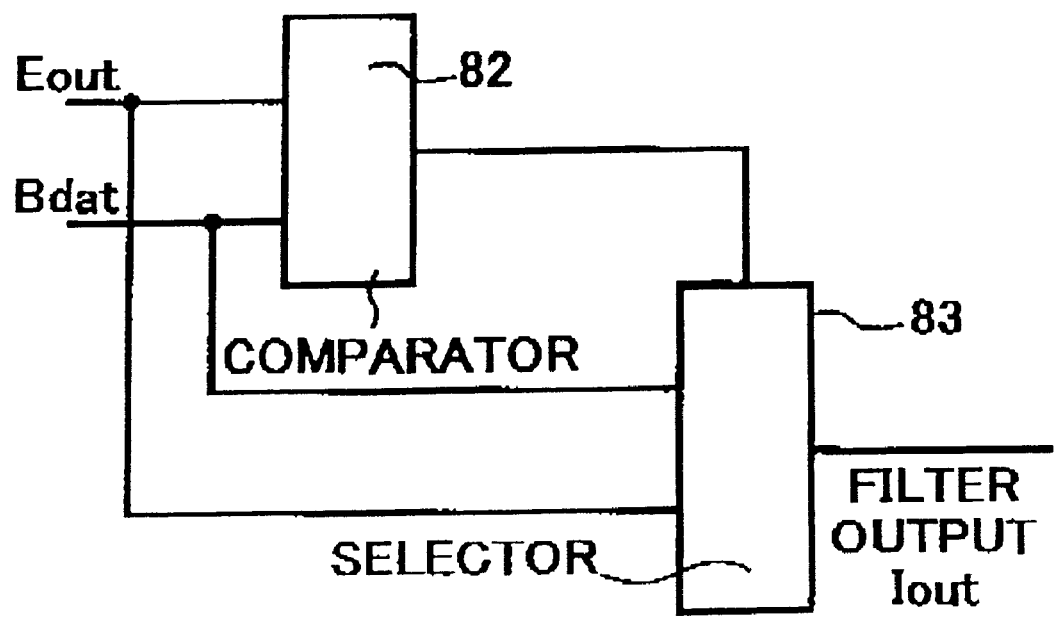
FIG. 21 is a block diagram for illustrating an exemplary construction of an output determination circuit that is utilized in the fourth to sixth embodiments.

The output determination circuit 54 may include a comparator 82 and a selector 83 as illustrated by a block diagram in FIG. 21. The comparator 82 may compare an output (Eout) of the edge emphasis circuit 51 with that (Bdat) of the bias addition circuit 53. The compared result may then be output to the selector 83. The selector 83 may output one of these outputs (Eout) and (Bdat) as a final output (Iout) in accordance with a set value. According to the fourth embodiment, an edge can be emphasized without being dull while ringing is substantially suppressed during the Laplace operation that is performed for a sharp edge portion. In addition, since an edge emphasized result is most preferably controlled referring to a value that is obtained by adding a prescribed amount of bias to a neighboring value, a high quality image can be reproduced whatever recording apparatus is connected to a post image processing apparatus.

The fifth embodiment relates to an edge emphasis circuit and is now described with reference to FIGS. 13, 17, and 18.

Figure 13:
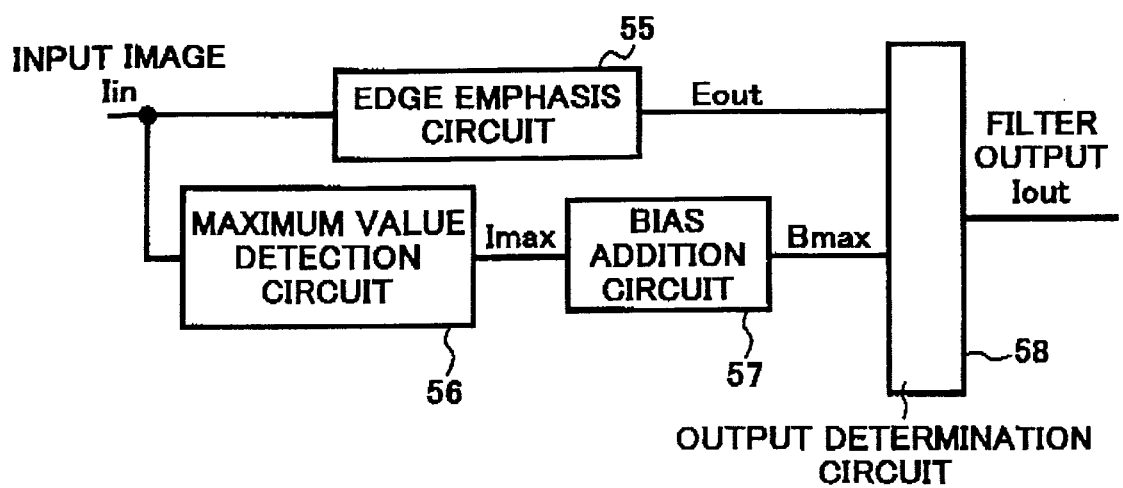
FIG. 13 is a block diagram for illustrating an exemplary construction of an image processing circuit of the fifth embodiment.

In more detail, FIG. 13 is a block diagram for illustrating an important section of an image data processing circuit provided in an image data processing apparatus according to this embodiment of the present invention. As noted therefrom, the image data processing circuit may include an edge emphasis circuit 55 that emphasizes an edge of an input mono color image data (Iin) using a Laplace Operation. A maximum value detection circuit 56 may also be included so as to detect, from the input mono color image data (Iin), a maximum value (Imax), for example, in 3×3 pixels that neighbor on a target pixel. A bias addition circuit 57 may also be included so as to add a prescribed amount of bias to the output (Imax) of the maximum value detection circuit 56. An output determination circuit 58 may also be included so as to control and determine an output from both of outputs (Eout) and (Bmax) that are output from the edge emphasis circuit 55 and the bias addition circuit 57, respectively.

The input image data (Iin) may be similar to that described in the fourth embodiment and is assumed to have 8 bit data (i.e., 256 gradations). In addition, a gradation number for a white portion of a document may assumed to be 255, and that for a black portion may be assumed to be zero for the purpose of facilitating the following explanation. However, 4 or 12 bits may be employable. Similarly, the neighboring area may be supposed to include 3×3 pixels. However, 5×3, 3×1, and another number of pixels may be employable.

The edge emphasis circuit 55 may be a type that utilizes a Lapalacian filter, and is similarly configured to the fourth embodiment as illustrated in FIG. 5. For example, a Lapalacian filter illustrated in FIG. 17 may be utilized to similarly function to that in the fourth embodiment.

Figure 18:
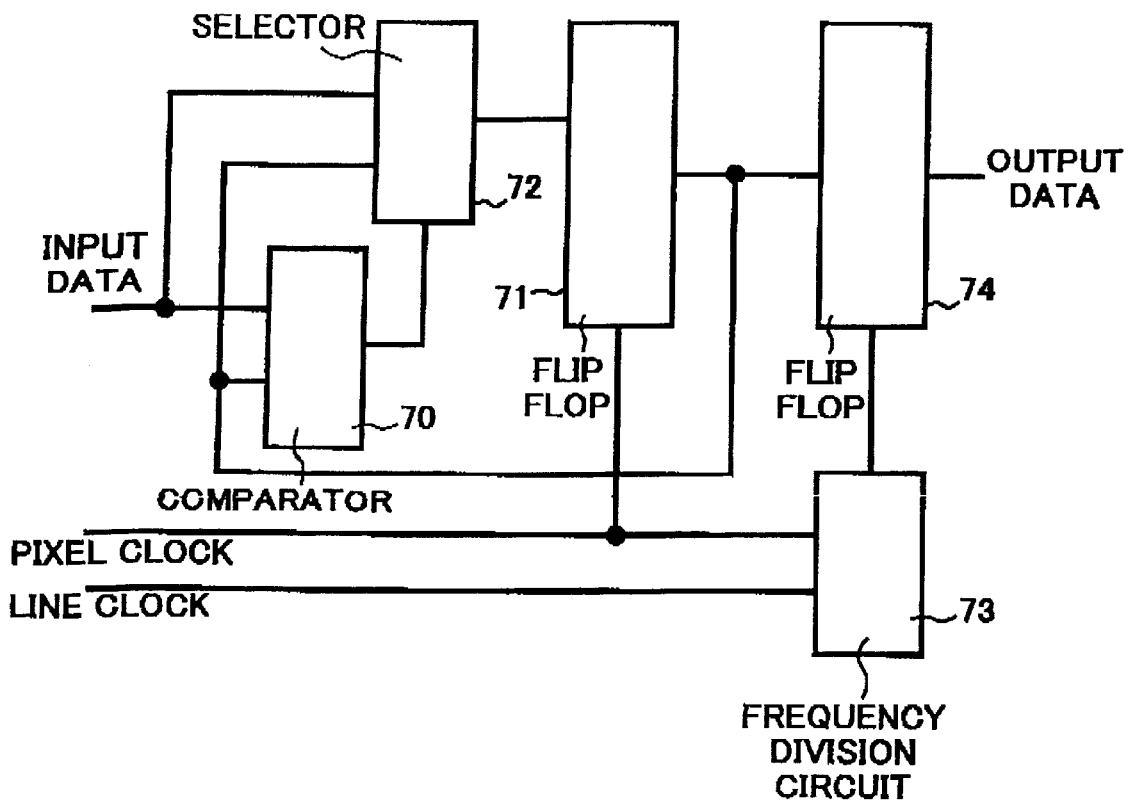
FIG. 18 is a block diagram for illustrating exemplary constructions of both maximum and minimum value detection circuits that are utilized in the fourth to sixth embodiments.

As illustrated in FIG. 18, the maximum value detection circuit 56 may include a comparator 70, a first flip-flop 71, a selector 72, and a second flip-flop 74. In such a circuit, image data (Iin) may initially be compared by the comparator 70 with a value stored in the flip-flop 71. The comparator 70 may then output the comparison result to the selector 72. The selector 72 may then output one of the image data (Iin) and the data stored by the first flip-flop 71 to the first flip-flop 71 based on the result of the comparison by the comparator 70. The first flip-flop 71 may then latch and output the output from the selector 72 to both the second flip-flop 74 and the comparator 70.

The frequency division circuit 73 may divide both a pixel clock that is input to the first flip-flop 71 and a line clock, and may output each of the clocks to the second flip-flop 74 once per 3 clocks and 3 lines. The frequency division circuit 73 may be formed in accordance with a neighborhood size. The second flip-flop 74 may latch the output of the first flip-flop 71 at a clock timing that is output from the frequency division circuit 73 and output the maximum value (Imax).

As illustrated in FIG. 19, the bias addition circuit 57 may be similarly configured to that described in the fourth embodiment. In this embodiment, the adder 76 may add a prescribed amount of bias that is stored in the memory 75 to the output (Imax) of the maximum value detection circuit 56 of FIG. 13. The addition result may then be output to the output determination circuit 58 of FIG. 13. The memory 75 can allow storage of positive and negative biases having an optional amount.

The output determination circuit 58 may be similar to that of the fourth embodiment as illustrated by a block diagram in FIG. 21, and may include a comparator 82 and a selector 83. The comparator 82 may compare the outputs (Eout) and (Bmax) of the edge emphasis circuit 55 and the bias addition circuit 57, and then output the comparison result to the selector 83. The selector 83 may then output one of the outputs (Eout) and (Bmax) as a final output (Iout).

Turning back to FIG. 13, the output determination circuit 58 may determine a filter output (Iout) as described in the following formula utilizing both the outputs (Eout) and (Bmax) that are output front the edge emphasis circuit 55 and the bias addition circuit 57, respectively.

$$Eout \geq Bmax : Output(Iout) = Bmax$$

$$Eout < Bmax : Output(Iout) = Eout$$

According to this embodiment, over shoot can be minimized and an edge can be emphasized without being dull by adding a prescribed amount of bias to a maximum value of a neighboring area and referring thereto. As a result, toner scatter that generally occurs during coloration of a character and duplication due to excessive edge emphasis can be minimized, and a high quality image can be reproduced.

The sixth embodiment relates to an edge emphasis circuit and is now described with reference to FIGS. 14, 17, 19, and 21.

Figure 14:
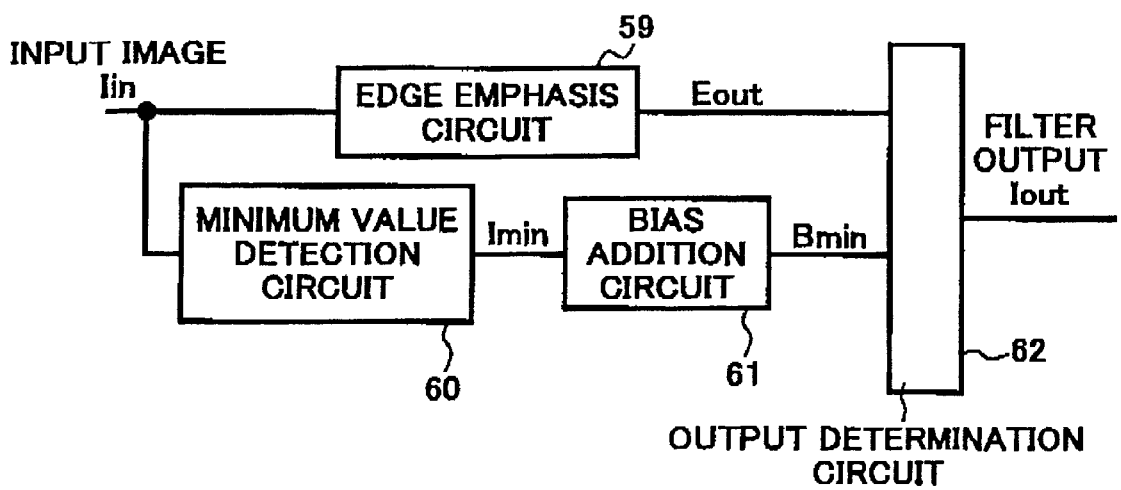
FIG. 14 is a block diagram for illustrating an exemplary construction of an image processing circuit of the sixth embodiment.

In more detail, FIG. 14 is a block diagram for illustrating an important section of an image data processing circuit of the image data processing apparatus of this embodiment according to the present invention. The image data processing circuit may include an edge emphasis circuit 59 that emphasizes an edge of mono color image data (Iin) as an input by utilizing a Laplace operation. A minimum value circuit 60 may also be included therein so as to detect from the input mono color image data (Iin) the minimum value (Imin), for example, in 3×3 pixels that neighbor on a target pixel. A bias addition circuit 61 may also be included therein so as to add a prescribed amount of bias to the output (Imin) from the minimum value circuit 60. An output determination circuit 62 may also be included therein so as to control and determine an output from both of the outputs (Eout) and (Bmin) that are output from the edge emphasis circuit 59 and the bias addition circuit 61, respectively.

The input image data (Iin) may be similar to that described in the fourth embodiment as is assumed to have 8 bit data (i.e., 256 gradations). In addition, a gradation number for a white portion of a document may be assumed to have 255 and that of a black portion may be assumed to have zero for the purpose of facilitating the following explanation. However, 4 or 12 bits may be employable. Similarly, the neighboring area may be assumed to include 3×3 pixels. However, 5×3, 3×1, and another number of pixels may be employable.

The edge emphasis circuit 59 may be a type that uses a Laplacian filter and is similarly configured to that of the fourth embodiment. For example, a Laplacian filter as illustrated in FIG. 17 may be employed so as to similarly function as in the fourth embodiment.

The minimum value detection circuit 60 may have a similar construction to applicable devices in the fifth embodiment that is described with reference to FIG. 18. Specifically, the minimum value detection circuit 60 may include a comparator 70, a first flip-flop 71, a selector 72, and a second flip-flop 74 each of which functions in a similar manner to each applicable device of the fourth embodiment. However, the second flip-flop 74 may latch the output of the first flip-flop 71 at a prescribed timing of a clock that is output from a frequency division circuit 73 and output the minimum value (Imin).

A bias addition circuit 61 of FIG. 14 may also be similar to that in the fourth embodiment illustrated in FIG. 19. An adder 76 may add a prescribed amount of bias that is stored in a memory 75 to an output (Imin) of the minimum value detection circuit 60 and output the addition result to an output determination circuit 62.

The output determination circuit 62 may also be similar to that in the fourth embodiment illustrated by a block diagram in FIG. 21. Specifically, the output determination circuit 62 may include a comparator 82 and a selector 83. The comparator 82 may compare outputs (Eout) and (Bmin) that are output from the edge emphasis circuit 59 and the bias addition circuit 61, respectively, and output the comparison result to the selector 83. The selector 83 may then output one of the outputs (Eout) and (Bmin), as a final output (Iout).

Turning back to FIG. 14, the output determination circuit 62 may determine a filter output (Iout) as described in the following formula utilizing both the outputs (Eout) and (Bmin).

$$Eout \leq Bmin : Output(Iout) = Bmin$$
$$Eout > Bmax : Output(Iout) = Eout$$

According to this embodiment, under shoot can be minimized and an edge can be emphasized without being dull by adding a preferable amount of bias and refer to the minimum value of a neighboring area. As a result, a high quality image can be reproduced while avoiding a dropout that tends to occur on a color ground or the like.

The seventh embodiment is now described with reference to FIGS. 15, 17, 18, and 20.

Figure 15:
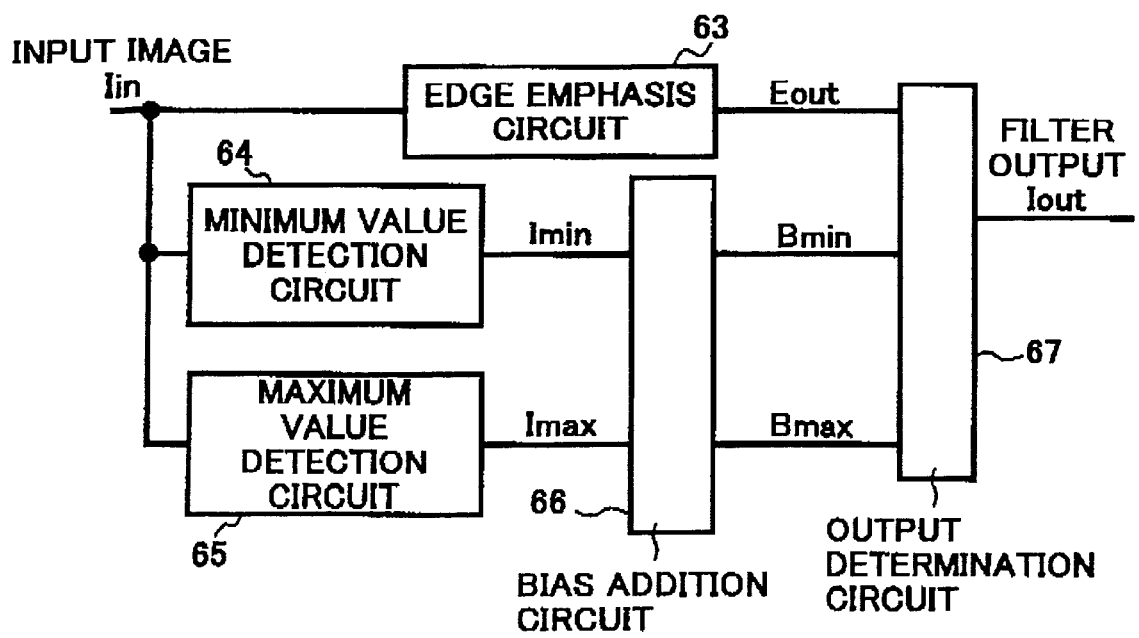
FIG. 15 is a block diagram for illustrating an exemplary construction of an image processing circuit of the seventh embodiment.

In more detail, FIG. 15 is a block diagram for illustrating an important section of an image processing circuit that is provided in an image processing apparatus according to this embodiment of the present invention. The image processing circuit may include an edge emphasis circuit 53 that emphasizes an edge of an input mono color image data (Iin) using a Laplace operation. A maximum value detection circuit 64 may also be included so as to detect from the input mono color image data (Iin) a maximum value (Imax), for example, in 3×3 pixels that neighbor on a target pixel. A bias addition circuit 66 may also be included so as to add a prescribed amount of bias that is determined from a difference between the outputs (Imax) and (Imin) that are output from the maximum value detection circuit 65 and the minimum value detection circuit 64. An output determination circuit 67 may also be included so as to control and determine an output from all of the outputs (Eout), (Bmax), and (Bmin) that are output from the edge emphasis circuit 63 and the bias addition circuit 66, respectively.

The input image data (Iin) may be similar to that described in the fourth embodiment, and is assumed to have 8 bit data (i.e., 256 gradations). In addition, a gradation number for a white portion of a document may be assumed to be 255 and that for a black portion may be assumed to be zero for the purpose of facilitating the following explanation. However, 4 or 12 bits may be employable. Similarly, the neighboring area may be assumed to include 3×3 pixels. However, 5×3, 3×1, and another number of pixels may be employable.

The edge emphasis circuit 63 may be a type that utilizes a Laplacian filter. The edge emphasis circuit 63 may similarly be configured to that in the fourth embodiment illustrated in FIG. 5. For example, a Laplacian filter as illustrated in FIG. 17 may be utilized and function in a similar manner as in the fourth embodiment.

Both of the minimum and maximum value detection circuits 64 and 65 may also include a comparator 70, a first flip-flop 77, a selector 72, and a second flip-flop 74 in a similar manner as in the fifth embodiment as illustrated in FIG. 18. In addition, those devices may similarly function as in the fifth embodiment. However, the second flip-flop 74 of the minimum value detection circuit 64 may latch an output of the first flip-flop 71 at a timing of a clock that is output from a frequency division circuit 73 and then output a minimum value (Imin). In contrast, the second flip-flop 74 of the maximum value detection circuit 65 may latch an output of the first flip-flop 71 at a timing of a clock that is output from a frequency division circuit 73 and then output a maximum value (Imax).

Figure 20:
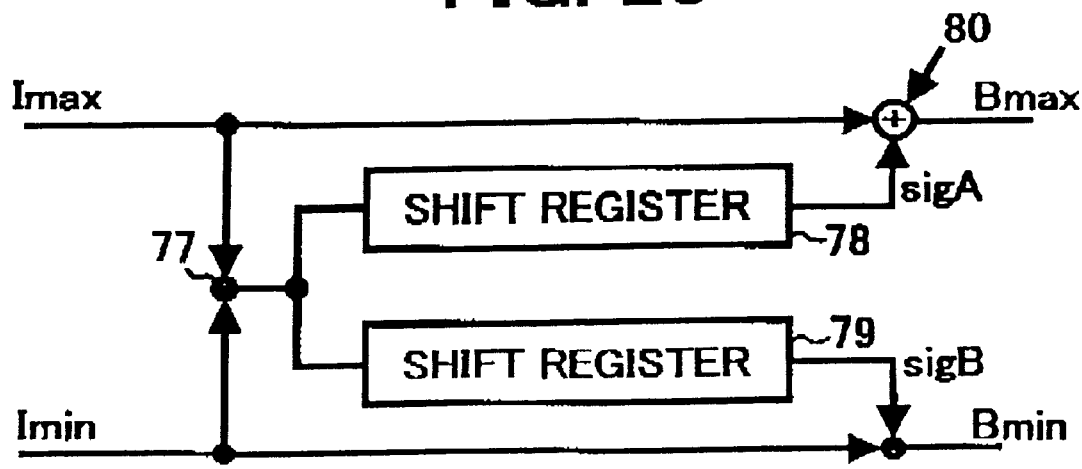
FIG. 20 is a block diagram for illustrating an exemplary construction of a bias addition circuit that is utilized in the seventh embodiment.

As illustrated in FIG. 20, the bias addition circuit 66 may include a first subtraction device 77, first and second shift registers 78 and 79, an adder 80, and a second subtraction device 81. By constructing the above-described devices in such a manner, both outputs (Imin) and (Imax), each of which is output from the minimum value detection circuit 64 or the maximum value detection circuit 65, may be input to the first subtraction device 77. A difference between the values (Imax) and (Imin) may be then output to both the first and second shift registers 78 and 79.

The first shift registers 78 may be a two bits right shift register that performs two bits right shift for the difference value (Imax-Imin) as an output of the first subtraction device 77, and outputs the two bits right shift result (sigA) to the adder 80. The second shift registers 79 may be a four bits right shift register that performs four bits right shift for the difference value (Imax-Imin) as an output of the first subtraction device 77, and outputs the four bits right shift result (sigB) to the second subtraction device 81. The adder 80 may add the output (sigA) of the first shift register 78 to the output (Imax) of the maximum value detection circuit 65 and then output an output (Bmax) to the output determination circuit 67 of FIG. 15.

The second subtraction device 81 may subtract the output (sigB) of the second shift registers 79 from the output (Imin) of the minimum value detection circuit 64, and then output an output (Bmin) to the output determination circuit 67. Although both of the shift registers 78 and 79 are two and four bits right shift registers in this embodiment, respectively, those registers 78 and 79 can have an optional number of bits.

Figure 22:
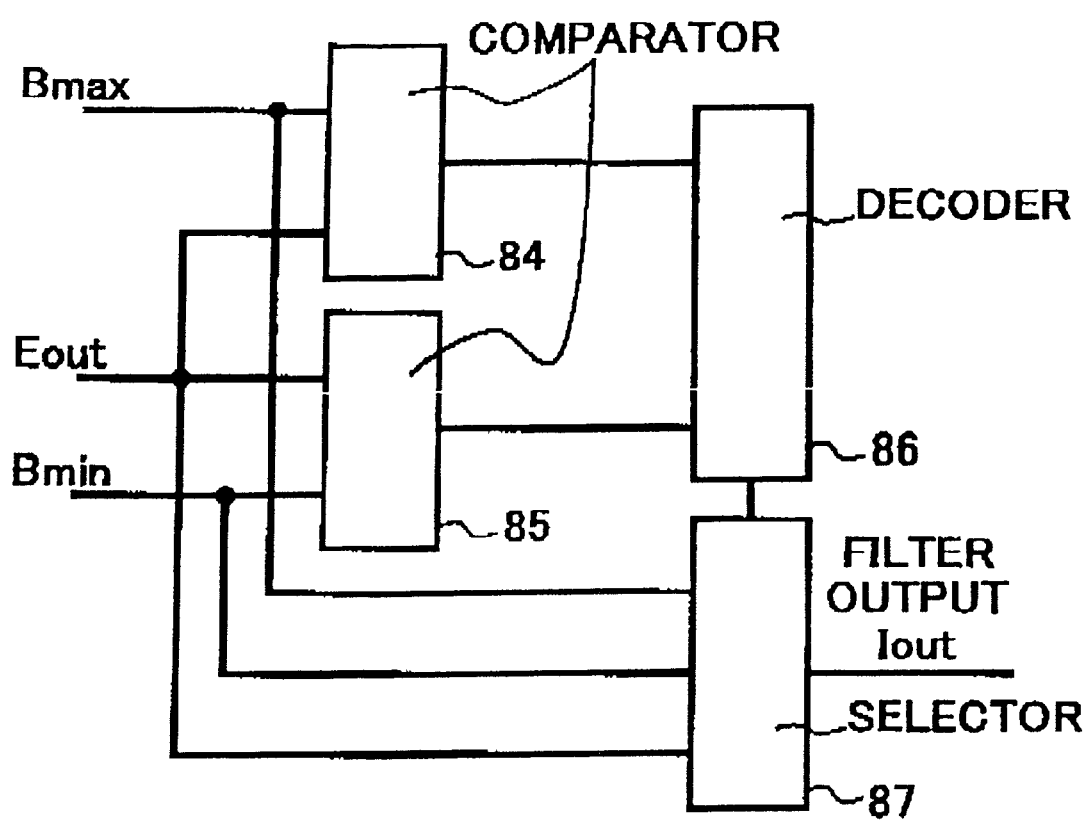
FIG. 22 is a block diagram for illustrating an exemplary construction of an output determination circuit that is utilized in the seventh embodiment.

As illustrated by a block chart in FIG. 22, the output determination circuit may include first and second comparators 84 and 85, a decoder 86, and a selector 87. The comparator 84 may compare the output (Eout) of the edge emphasis circuit 63 with the output (Bmax) of the bias addition circuit 66. In contrast, the comparator 85 may compare the output (Eout) of the edge emphasis circuit 63 with the output (Bmin) of the bias addition circuit 66. These compared results may be input to the decoder 86.

The decoder 86 may determine from these compared results if the (Eout) of the edge emphasis circuit 63 exists between the outputs (Bmax) and (Bmin), if the (Eout) of the edge emphasis circuit 63 is larger than the output (Bmax), and if the (Eout) of the edge emphasis circuit 63 is smaller than the output (Bmin). The decoder 86 may then output a signal that designates a final output of a filter to the selector 87. The selector 87 may output any one of the outputs (Eout), (Bmax), and (Bmin) of the edge emphasis circuit 63, and the bias addition circuit 66 as a final output (Iout) in accordance with the designated signal from the decoder 86.

The output determination circuit 67 may determine an output (Iout) of the filter in a manner as described in the following formula using each of the outputs (Eout), (Bmax), and (Bmin).

$Eout > Bmax : Output(Iout) = Bmax$ $Eout \leq Bmin : Output(Iout) = Bmin$ $Bmin < Eout < Bmax : Output(Iout) = Eout$ According to this embodiment, an amount of bias can automatically be adjusted in accordance with input data with a simple construction. In addition, both over and under shoots can be minimized and an edge can be emphasized without being dull by referring to both of the maximum and minimum values of a neighboring area. As a result, toner scatter that generally occurs during coloration of a character and duplication due to excessive edge emphasis can be minimized, and a high quality image can be reproduced.

According to these embodiments, excessive edge emphasis due to ringing can substantially be removed if an output for edge emphasis is designed between a pair of values that are obtained by adding a prescribed amount of bias to each of the maximum and minimum values in an area that neighbors on a target pixel. In addition, edge emphasis can be effectively performed while minimizing deterioration of an image.

Although these embodiments are described premising that input image data include a mono color, a full color image data can substantially be handled if a circuit similar to that described with reference to FIGS. 13, 14 and 15 is prepared and utilized for each mono color. For example, three and four circuits may be prepared and utilized when RGB data and CMYK data are utilized.

Figure 23:
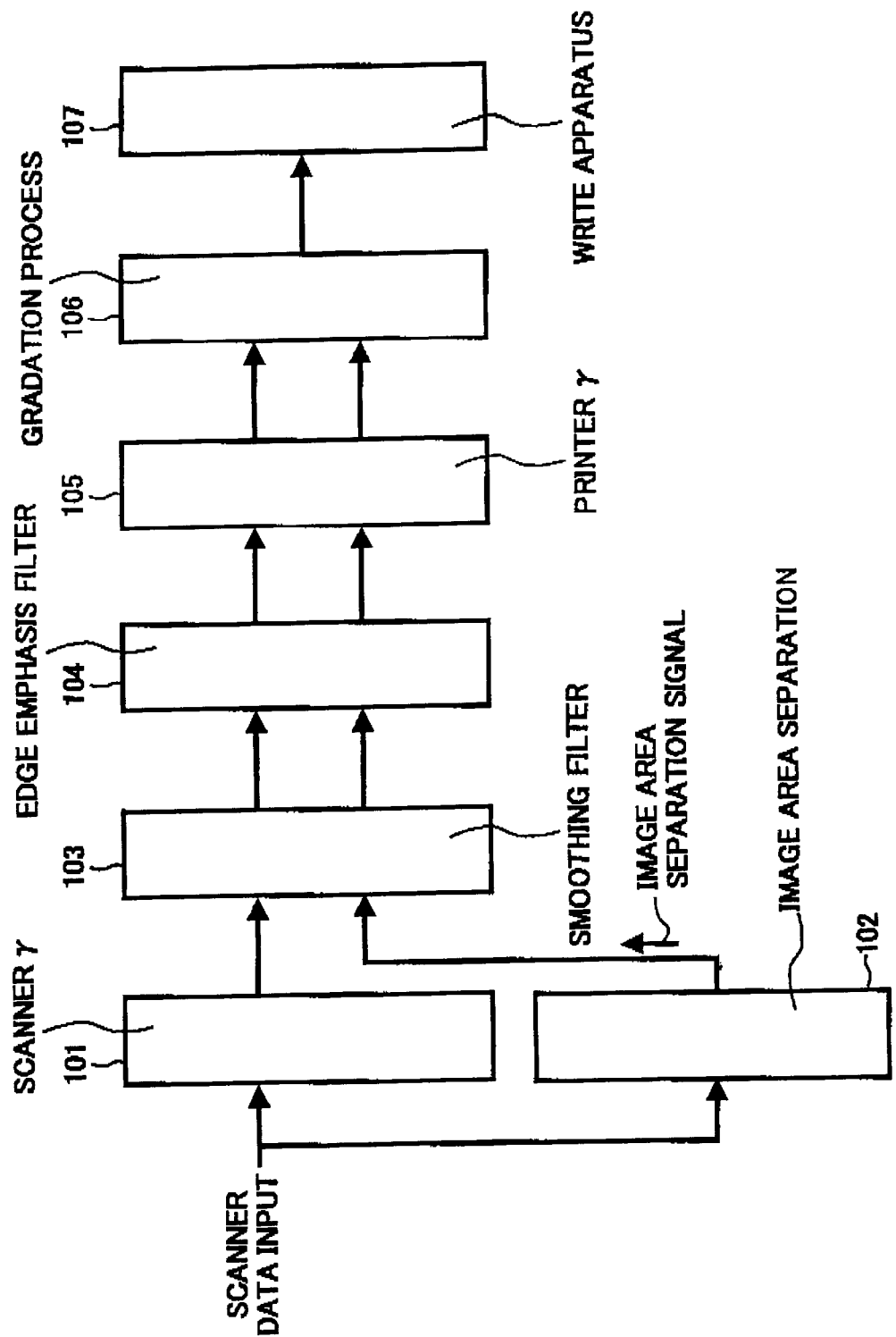
FIG. 23 is a block diagram for illustrating a background printer.
Figure 24:
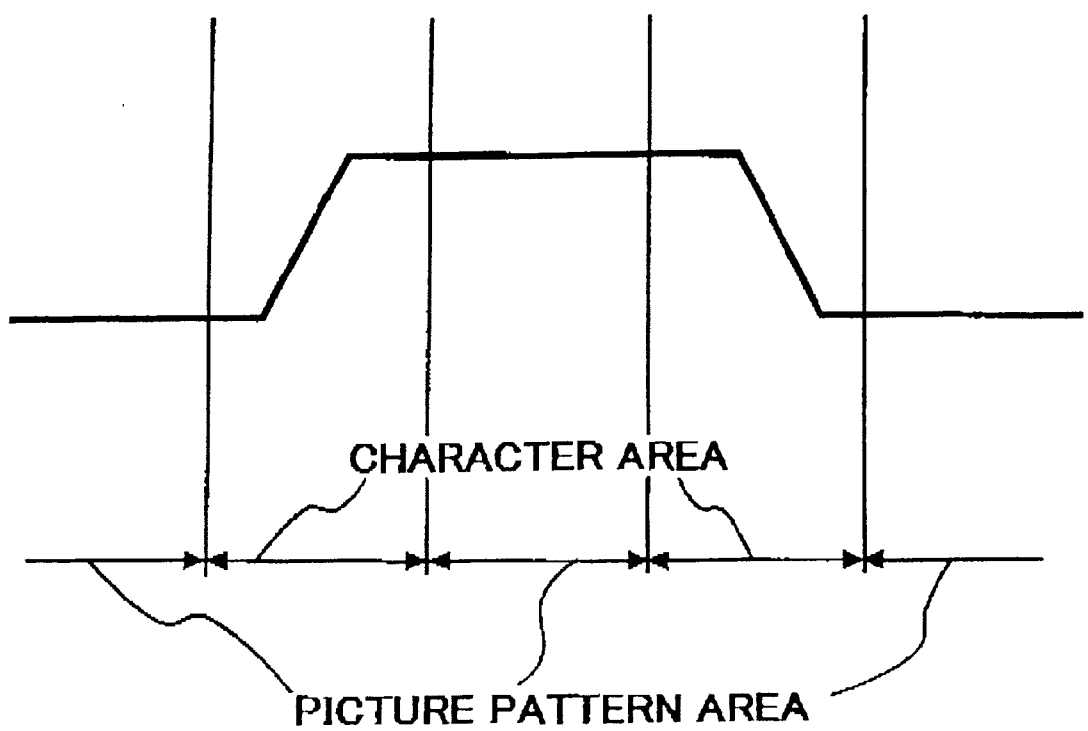
FIG. 24 is a diagram for illustrating an exemplary brightness data that is obtained by a scanner γ conversion circuit.
Figure 25:
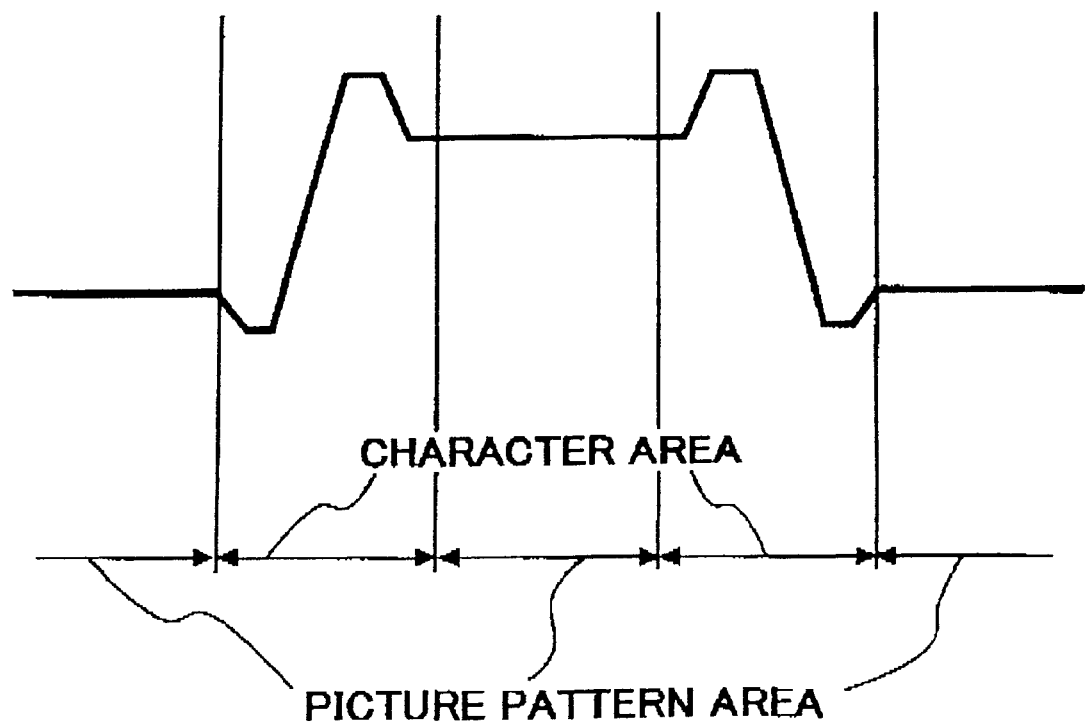
FIG. 25 is a diagram for illustrating an exemplary brightness data that has received an edge emphasis treatment from an edge emphasis filter 104.
Figure 26:
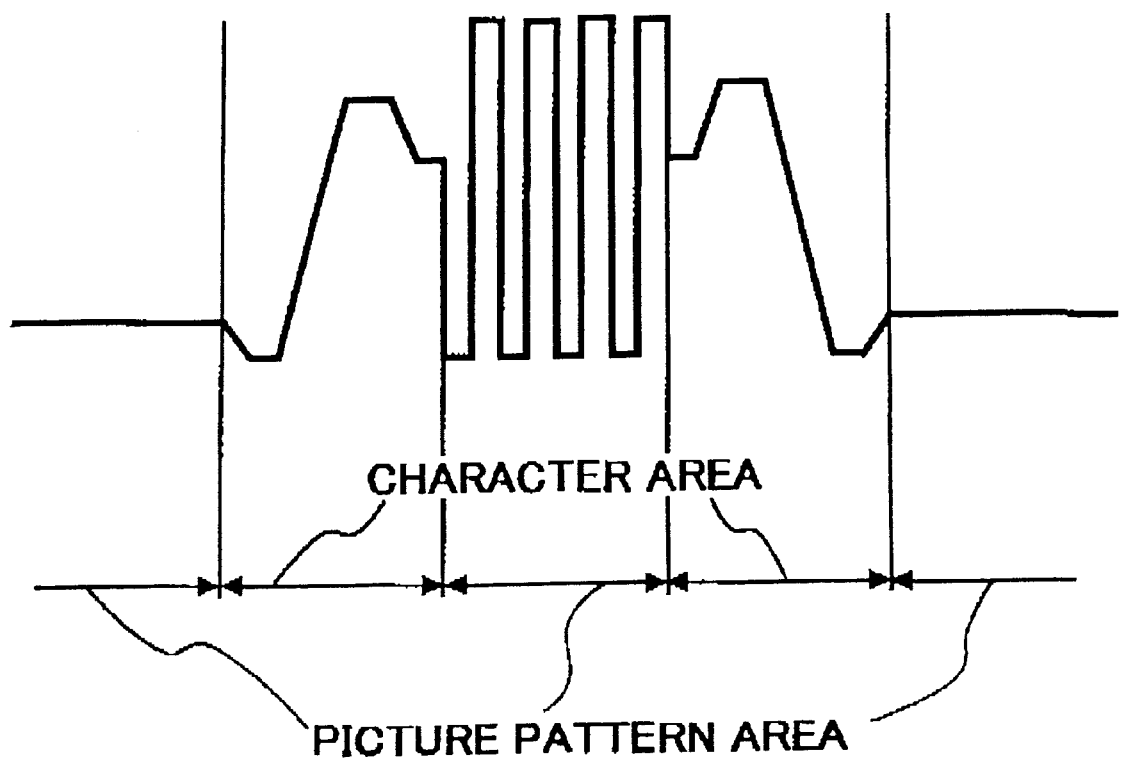
FIG. 26 is a diagram for illustrating exemplary brightness data of in a center of a character section that is determined by a gradation process circuit as a picture pattern area and has received application of a dither pattern having 1×2 pixels from the gradation process circuit.
Figure 27:
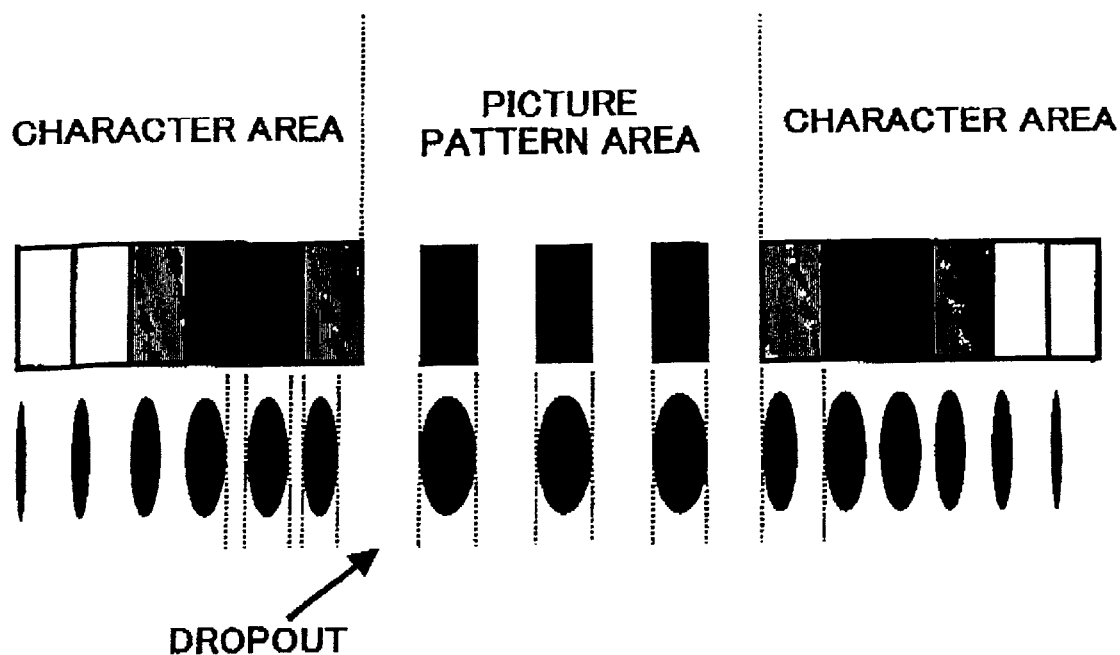
FIG. 27 is a diagram for illustrating both an exemplary shape of a laser spot whose OF/OFF is controlled in a left side alignment as a reference, and an exemplary image that is reproduced in a duplication medium.
Figure 28:
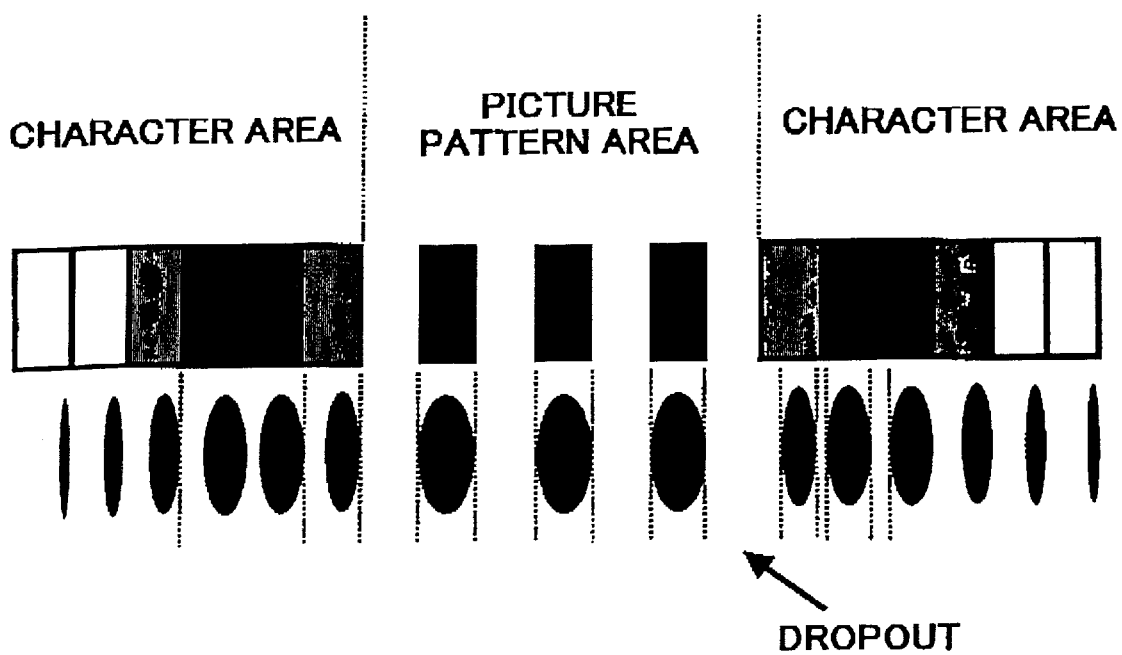
FIG. 28 is a diagram for illustrating an example of a shape of a laser spot whose OF/OFF is controlled in a right side alignment as a reference, and an image that is reproduced in a duplication medium.

Furthermore, each of the image data processing apparatuses illustrated in the first to third embodiments can be used as a gradation process circuit of the printer output apparatus illustrated in FIG. 23. Each of the image data processing apparatuses illustrated in the fourth to seventh embodiments can be used as an edge emphasis circuit of the printer output apparatus illustrated in FIG. 23.

Furthermore, each of the image data processing apparatus from the first to third embodiments can be applied to the printer illustrated in FIG. 23 as a gradation process circuit. Also, each of the image data processing apparatus from the fourth to seventh embodiments can be applied to the printer illustrated in FIG. 23 as an edge emphasis circuit. With such devices, mono chrome and color prints having a high quality can be reproduced while minimizing a dropout in a character portion.

The mechanisms and processes set forth in the present invention may be implemented using one or more conventional general purpose microprocessors and/or signal processors programmed according to the teachings in the present specification as will be appreciated by those skilled in the relevant arts. Appropriate software coding can readily be prepared by skilled programmers based on the teachings of the present disclosure, as will also be apparent to those skilled in the relevant arts.

However, as will be readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

What is claimed is:

1. An image data processing apparatus configured to separately apply prescribed gradation treatment to character and picture pattern areas included in an input image signal and to output a prescribed image signal to a write section having a laser, said image data processing apparatus comprising:

an image area separation signal generating device configured to generate an image areas separation signal;

a pattern storage device configured to store at least one pattern indicating prescribed mimetic halftone treatment applied to the input image signal;

an address decoding device configured to decode a prescribed address of the pattern storage device in accordance with the input image signal;

a changing device configured to change a character/picture pattern switch position of the image area separation signal with reference to an output of the address decoding device; and a picture pattern/character selecting device configured to select one of a character area and a picture and pattern area in accordance with the image area separation signal changed by a the changing device.

2. The image data processing apparatus according to claim 1, wherein said address decoding device includes:

a pixel clock counter configured to have at least one bit and to count a number of pixels in a main scanning direction;

a horizontal synchronization signal counter configured to have at least one bit and to count a number of pixels in a sub scanning direction; and a flip-flop configured to adjust delay in the input image signal.

3. The image data processing apparatus according to claim 1, wherein said changing device includes:

a flip-flop configured to latch the input image area separation signal;

an inverter configured to logically invert the input image area separation signal;

an AND circuit configured to apply an AND gate to outputs from the flip-flop, the inverter, and the address decoding device; and a selector configured to select one of signals of the AND circuit and the image area separation signal and to output an image area separation change signal.

4. The image data processing apparatus according to claim 1, wherein said halftone treatment is performed using a dither method.

5. The image data processing apparatus according to claim 1, wherein a mono chrome or color print is output.

6. An image data processing apparatus configured to separately apply prescribed gradation treatment to character and picture pattern areas included in an input image signal and to output a prescribed image signal to a write section having a laser, said image data processing apparatus comprising:

an image area separation signal generating device configured to generate an image area separation signal;

a pattern storage device configured to store at least one pattern indicating prescribed mimetic halftone treatment applied to the input image signal;

a pattern size storage device configured to store a number of pixels included in the mimetic halftone pattern;

an address decoding device configured to decode a prescribed address of the pattern storage device in accordance with the input image signal and the number of pixels of the mimetic halftone treatment pattern stored in the pattern size storage device;

a changing device configured to change a character/picture pattern switch position of the image area separation signal with reference to an output of the address decoding device; and a picture pattern/character selecting device configured to select one of a character areas and a picture and pattern area in accordance with the image area separation signal changed by the changing device.

7. The image data processing apparatus according to claim 6, wherein said address decoding device includes:

a pixel clock counter configured to have at least two bits and to count a number of pixels in a main scanning direction;

a horizontal synchronization signal counter configured to have at least one bit and to count a number of pixels in a sub scanning direction; and a flip-flop configured to adjust delay in the input image signal.

8. The image data processing apparatus according to claim 6, wherein said changing device includes:

a flip-flop configured to latch the input image area separation signal;

a first inverter configured to logically invert the input image area separation signal;

an OR circuit configured to apply an OR gate to two bits of address signals output from the address decoding device;

an AND circuit configured to apply an AND gate to outputs from the flip-flop, the first inverter and the OR circuit;

a second inverter configured to logically invert an output signal from the OR circuit;

a JK flip-flop configured to be set by an output signal of the AND circuit and reset by an output signal of the second inverter; and a selector configured to select one of outputs of the JK flip-flop and the image area separation signal and to output an image area separation change signal.

9. The image data processing apparatus according to claim 6, wherein said halftone treatment is performed using a dither method.

10. The image data processing apparatus according to claim 6, wherein a mono chrome or color print is output.

11. An image data processing apparatus configured to separately apply prescribed gradation treatment to character and picture pattern areas included in an input image signal and to output a prescribed image signal to a write section having a laser, said image data processing apparatus comprising:

an image area separation signal generating device configured to generate an image area separation signal;

a pattern storage device configured to store at least one pattern indicating prescribed mimetic halftone treatment applied to the input image signal;

an address decoding device configured to decode a prescribed address of the pattern storage device in accordance with the input image signal;

a write reference position setting device configured to set a reference position for writing an input image signal with a dot either to left or right side alignments;

a changing device configured to change a character/picture pattern switch position of the image area separation signal with reference to a signal set in the write reference position setting device and an output of the address decoding device; and a picture pattern/character selecting device configured to select one of a character area and a picture and pattern area in accordance with the image area separation signal changed by the changing device.

12. The image data processing apparatus according to claim 11, wherein said address decoding device includes:

a pixel clock counter configured to have at least one bit and to count a number of pixels in a main scanning direction;

a horizontal synchronization signal counter configured to have at least one bit and to count a number of pixels in a sub scanning direction; and a flip-flop configured to adjust delay in the input image signal.

13. The image data processing apparatus according to claim 11, wherein said changing device includes:
    a flip-flop configured to latch the input image area separation signal;
    a first inverter configured to logically invert the input image area separation signal;
    a first AND circuit configured to apply an AND gate to output signals from the flip-flop;
    a first inverter configured to logically invert the input image area separation signal;
    a first AND circuit configured to apply an AND gate to the output signals from the flip-flop,
    the first inverter and the address decoding device;
    a second inverter configured to logically invert an output signal from the flip-flop;
    a third inverter configured to logically invert an output signal from the address decoding device;
    a second AND circuit configured to apply an AND gate to output signals from the second and third inverters and the image area separation signal;
    a first selector configured to select one of output signals from the first and second AND circuits in accordance with a signal set in the write reference position setting device; and
    a second selector configured to select one of combinations of an output from the first AND circuit and an image area separation signal, and that from the second AND circuit and an image area separation signal.

14. The image data processing apparatus according to claim 11, wherein said halftone treatment is performed using a dither method.

15. The image data processing apparatus according to claim 11, wherein a mono chrome or color print is output.

16. An image data processing apparatus configured to emphasize an edge of an input image signal, comprising:
    a value detecting device configured to detect a value of pixels neighboring on a target pixel;
    an edge emphasis device configured to emphasize an edge of the input image signal using a Laplace operation;
    a bias adding device configured to add a prescribed amount of bias to the value of the neighboring pixels detected by the value detecting device; and
    a signal outputting device configured to compare and output one of outputs from the bias adding device and edge emphasis device.

17. The image data processing apparatus according to claim 16, wherein said value of the neighboring pixels is obtained by adding said bias amount to the maximum value thereof.

18. The image data processing apparatus according to claim 16, wherein said value of the neighboring pixels is obtained by adding said bias amount to the minimum value thereof.

19. The image data processing apparatus according to claim 16, wherein said bias amount is determined from the neighboring pixel value.

20. The image data processing apparatus according to claim 16, wherein a mono chrome or color print is output.

21. An image processing method, comprising the steps of:
    obtaining an image area separation signal;
    smoothing an input image signal referring to the image area separation signal;
    emphasizing an edge of an input wage signal referring to the image area separation signal; and
    performing a gradation treatment for an picture pattern area in a mimetic halftone treatment manner in accordance with the image area separation signal including information related to a character/picture pattern switch position,
    wherein said step of performing a gradation treatment includes a step of deviating the character/picture pattern switch position back and forth, and a step of regarding an edge area between character and picture pattern areas of the input image signal emphasized by the edge emphasizing step as a character area.

22. The image processing method according to claim 21, wherein an amount of said deviation is changed in accordance with the mimetic halftone treatment mannec applied to the picture pattern area.

23. The image processing method according to claim 21, wherein said deviation direction is changed in accordance with a write reference position for a dot in a pixel.

* * * * *